United States Patent
Liu et al.

(10) Patent No.: US 12,222,259 B1
(45) Date of Patent: Feb. 11, 2025

(54) ROLLING BEARING FAULT DIAGNOSIS METHOD BASED ON FAST FOURIER TRANSFORM CODING AND LIGHTWEIGHT CONVOLUTIONAL NEURAL NETWORK

(71) Applicant: Guangdong University of Petrochemical Technology, Maoming (CN)

(72) Inventors: Mei Liu, Maoming (CN); Kun Cui, Maoming (CN); Huizi Han, Maoming (CN); Shijie Liu, Maoming (CN)

(73) Assignee: GUANGDONG UNIVERSITY OF PETROCHEMICAL TECHNOLOGY, Maoming (CN)

( * ) Notice: Subject to any disclaimer, the term of this patent is extended or adjusted under 35 U.S.C. 154(b) by 0 days.

(21) Appl. No.: 18/898,744

(22) Filed: Sep. 27, 2024

(30) Foreign Application Priority Data

Nov. 10, 2023 (CN) .......................... 202311494001.1

(51) Int. Cl.
*G01M 13/045* (2019.01)
*G06N 3/0464* (2023.01)

(52) U.S. Cl.
CPC ........ *G01M 13/045* (2013.01); *G06N 3/0464* (2023.01)

(58) Field of Classification Search
None
See application file for complete search history.

(56) References Cited

U.S. PATENT DOCUMENTS

2018/0284758 A1* 10/2018 Cella ........................ H04L 1/18
2022/0065687 A1* 3/2022 Chen ........................ G01H 1/00

FOREIGN PATENT DOCUMENTS

| CN | 113780056 A | 12/2021 |
| CN | 116269259 A | 6/2023 |
| CN | 116662855 A | 8/2023 |
| KR | 102393095 A | 5/2022 |

OTHER PUBLICATIONS

China National Intellectual Property Administration, First Office Action for Chinese Patent Application No. 202311494001.1, pp. 1-3, Date of Issuance: Apr. 22, 2024, PRC.

* cited by examiner

*Primary Examiner* — Roy Y Yi

(74) *Attorney, Agent, or Firm* — JMB Davis Ben-David

(57) ABSTRACT

Provided is a rolling bearing fault diagnosis method based on FFT coding and L-CNN, including: obtaining original bearing fault vibration data, extracting intrinsic mode components of different frequency bands in the original bearing fault vibration data, calculating a permutation entropy value corresponding to each of the intrinsic mode components, and performing wavelet threshold denoising according to the permutation entropy value to obtain a denoised reconstructed time domain signal; performing fast Fourier transform to the denoised reconstructed time domain signal to obtain a frequency domain signal and a phase angle corresponding to the time domain signal, reconstructing the frequency domain signal according to a preset rule, retaining frequency domain data of features of the phase angle, and drawing FFT-x heat maps of different fault type data according to an amplitude range; and constructing an model L-CNN, and inputting coded data into the L-CNN model, and obtaining fault diagnosis results.

6 Claims, 24 Drawing Sheets

ROLLING BEARING FAULT DIAGNOSIS METHOD BASED ON FAST FOURIER TRANSFORM CODING AND LIGHTWEIGHT CONVOLUTIONAL NEURAL NETWORK

CROSS-REFERENCE TO RELATED APPLICATIONS

This application claims priority to Chinese Patent Application No. 202311494001.1, filed on Nov. 10, 2023, the contents of which are hereby incorporated by reference.

TECHNICAL FIELD

The disclosure relates to the technical field of fault diagnosis, in particular to a rolling bearing fault diagnosis method based on Fast Fourier Transform (FFT) coding and lightweight convolutional neural network (L-CNN).

BACKGROUND

Rolling bearing is one of the important components of rotating machinery. Due to the constant impact of load, rolling bearing is prone to crack and pitting corrosion, which will bring potential safety hazards to the whole equipment operation and even cause irreparable losses. Therefore, it is necessary to diagnose bearing faults more efficiently to ensure the stable operation of rotating machinery.

With the rapid development of the Internet of Things (IoT), sensors are applied to the bearing data acquisition system of rotating machinery to monitor the vibration signals of bearings at different positions, and technicians may diagnose the faults of rolling bearings by mining and analyzing a large number of available historical data. Based on bearing vibration signals, the traditional bearing fault diagnosis mainly include three steps of data preprocessing, feature extraction and data classification. The methods of data preprocessing mainly include wavelet transform, local mean decomposition, empirical mode decomposition, and variational empirical mode decomposition, etc. These methods may effectively retain the effective information in bearing fault signals while reducing the influence of noise and improving the accuracy and reliability of bearing fault diagnosis. After extracting the peak value, mean value, standard deviation, slope and kurtosis of bearing vibration signal from time series, the fault diagnosis of rolling bearing is carried out by machine learning methods such as random forest, support vector machine and extreme learning machine. By adopting these methods, the bearing faults may be effectively diagnosed. However, traditional methods mostly rely on human experience to extract fault feature information, and these methods often have shortcomings such as low diagnostic accuracy and poor robustness.

The concept of deep learning proposed in the prior art has solved the difficulty of manually extracting features in traditional diagnosis methods and enhanced the adaptability, and has been increasingly applied in the field of fault diagnosis by many scholars. For example, a deep convolutional neural network algorithm is used for fault identification of one-dimensional vibration signals, and good results have been achieved in fault diagnosis. A method of multi-channel input is available to enhance fault features to improve the diagnostic performance of one-dimensional convolutional neural network. Compared with single-channel convolutional neural network, the fault diagnosis accuracy is significantly improved. In the prior art, the classification performance of convolutional neural network for one-dimensional and two-dimensional data is compared. Compared with the signal input method of one-dimensional convolutional neural network, two-dimensional convolutional neural network may achieve higher accuracy and robustness. Due to the presence of noise in the vibration signal, two-dimensional convolutional neural network is non-stationary and convolutional neural network has great advantages in processing two-dimensional data. The bearing vibration signals are transformed into a gray scale image, and the fault diagnosis of rotating machinery is realized by combining the convolutional neural network. The diagnosis signals are transformed into a two-dimensional image by cyclic spectrum to serve as the input of convolutional neural network for fault diagnosis. A method of applying Markov migration field to transform bearing diagnosis time series data into images. A bearing fault diagnosis method combining lightweight model with Gram angular field further improves the performance of convolutional neural network diagnosis.

Among the above methods, the bearing diagnosis method based on convolutional neural network, which converts one-dimensional vibration data into two-dimensional images, improves the fault diagnostic accuracy, but the method relies too much on the resolution of coded images and the learning capability of models. The resolution of the image converted from one-dimensional vibration data is too high and the model structure is complex, which will greatly increase the calculation amount and seriously affect the diagnosis speed. When the resolution of the image converted from one-dimensional vibration data is too small and the learning capability of model features is low, fuzzy information and feature loss of the signals occur and seriously affect the diagnostic accuracy. Therefore, the disclosure provides a rolling bearing fault diagnosis method based on FFT coding and improved L-CNN.

SUMMARY

In view of the problems of low accuracy and slow diagnosis efficiency of convolutional neural network fault diagnosis method in rolling bearing, a rolling bearing fault diagnosis method based on FFT coding and L-CNN is proposed.

In order to achieve the above objective, the disclosure provides a rolling bearing fault diagnosis method based on FFT coding and L-CNN, including:
  obtaining original bearing fault vibration data, extracting intrinsic mode components of different frequency bands in the original bearing fault vibration data, calculating a permutation entropy (PE) value corresponding to each of the intrinsic mode components, and performing wavelet threshold denoising according to the permutation entropy value to obtain a denoised reconstructed time domain signal;
  performing fast Fourier transform to the denoised reconstructed time domain signal to obtain a frequency domain signal and a phase angle corresponding to the time domain signal, reconstructing the frequency domain signal according to a preset rule, retaining frequency domain data of features of the phase angle, and drawing Fast Fourier Transform-x (FFT-x) heat maps of different fault type data according to an amplitude range; and
  constructing an improved lightweight convolutional neural network model L-CNN, and inputting coded data in the FFT-x heat maps into the L-CNN model for processing and diagnosis, and obtaining fault diagnosis results.

Optionally, extracting the intrinsic mode components of different frequency bands in the original bearing fault vibration data includes:

S1.1, adding Gaussian white noises with normal distribution to the original bearing fault vibration data to obtain an i-th signal $y_i(t)$, and decomposing the i-th signal $y_i(t)$ by empirical mode decomposition (EMD) to obtain a first intrinsic mode function $IMF_1(t)$ and a residual component $r_1(t)$ of $y_i(t)$;

S1.2, using the residual component $r_1(t)$ as original data to decompose reconstructed $r_1(t)+\beta_1 E_1(\omega_i(t))$ to obtain an intrinsic mode function $IMF_2(t)$ and a residual component $r_2(t)$, where $E_1$ is EMD decomposition, $\beta_1$ is a standard deviation of the Gaussian white noises, and $\omega_i(t)$ is a Gaussian white noise; and S1.3, repeating the S1.2 to obtain a (k+1)-th intrinsic mode function $IMF_{k+1}(t)$ and a k-th residual component $r_k(t)$.

Optionally, performing wavelet threshold denoising according to the permutation entropy value includes:

judging a noisy level of the each of the intrinsic mode components according to the permutation entropy value, and dividing the each of the intrinsic mode components into an effective intrinsic mode function (IMF) and a noisy IMF according to the noisy level;

based on data features of the noisy IMF, selecting wavelet bases and decomposition layers to decompose noisy bearing fault vibration data, and calculating wavelet coefficients and selecting a Sqtwolog threshold to calculate a threshold corresponding to each of the wavelet coefficients, and quantizing the wavelet coefficients; and performing inverse wavelet transform to quantized wavelet coefficients to obtain a denoised IMF, and then reconstructing a bearing vibration signal from the effective IMF and the denoised IMF to obtain the denoised reconstructed signal.

Optionally, a method for calculating the wavelet coefficients is:

$$I_{CWT}(a, b) = \frac{1}{\sqrt{a}} \int x(t)\phi\left(\frac{t-b}{a}\right)dt$$

where $I_{CWT}$ is a wavelet coefficient, a is a scale function, b is a position function, and t is a delay time;

a method for calculating a threshold corresponding to each of the wavelet coefficients is:

$$th = \frac{mid}{0.6745}\sqrt{2\ln N}$$

where th is the threshold corresponding to the each of the wavelet coefficients, mid is a middle value of each decomposed band coefficient, and N is a length of the wavelet coefficient.

Optionally, drawing FFT-x heat maps of different fault type data includes:

decomposing the denoised reconstructed time domain signal into several single harmonic components by fast Fourier transform, and obtaining a relationship between amplitude, phase, power and frequency domain of each harmonic of the signal; and when the phase angle is in a first quadrant and a second quadrant, a frequency domain value is positive, and when the phase angle is in a third quadrant and a fourth quadrant, a frequency domain value is negative; and according to this characteristic, reconstructing the frequency domain signal, and according to an amplitude characteristic of a reconstructed frequency domain signal, setting a boundary to (−150, 150) for heat map coding.

Optionally, an expression of the reconstructed frequency domain signal is:

$$F(x) = \begin{cases} f(x) & \theta > 0 \\ -f(x) & \theta < 0 \end{cases}$$

where F(x) is the reconstructed frequency domain signal, f(x) is an original bearing frequency domain signal, and θ is the phase angle.

Optionally, inputting coded data in the FFT-x heat maps into the L-CNN model for processing and diagnosis, including:

capturing different levels of features of the coded data in the FFT-x from different scales by using convolution kernels with different sizes, and weighting captured features for importance of each channel by structures of global average pooling, one-dimensional convolution, channel multiplication and spatial replication through an efficient channel attention (ECA) attention mechanism; and processing a channel dimension and a spatial dimension of a color feature of an input FFT-x coded map by depth separable convolution to obtain a feature map; exchanging a channel sequence of the feature map between different depths and different groups by using a ChannelSplit module and a Channelshuffle module, and changing a channel arrangement mode; further extracting data features based on the residual and depth separable convolution; and finally, outputting the fault diagnosis results through average pooling and two fully connected layers.

Optionally, an objective function of the improved lightweight convolutional neural network model is evaluated as a cross entropy loss function:

$$\text{Loss} = -\sum_{i=1}^{output\ size} y_i \cdot \log \hat{y}_i$$

where Loss is a model loss value, $y_i$ is a model fault classification prediction value, and $\hat{y}_i$ is a model classification true value.

Compared with the prior art, the disclosure has following advantages and technical effects.

According to the disclosure, differences of frequency domain data features of different bearing fault types are expressed by FFT-x coding, and image features are diagnosed by the improved lightweight convolutional neural network, so that the tedious signal processing work required for extracting fault feature information from the original data is omitted, the labor cost is reduced, and the diagnosis accuracy is improved.

BRIEF DESCRIPTION OF THE DRAWINGS

The accompanying drawings constituting a part of this disclosure are used to provide a further understanding of this disclosure, and the illustrative embodiments of this disclosure and their descriptions are used to explain this disclosure, and do not constitute an improper limitation of this disclosure. In the attached drawings.

DETAILED DESCRIPTION OF THE EMBODIMENTS

It should be noted that the embodiments in this disclosure and the features in the embodiments may be combined with each other without conflict. The disclosure will be described in detail with reference to the attached drawings and embodiments.

It should be noted that the steps shown in the flow chart of the accompanying drawings may be executed in a computer system such as a set of computer-executable instructions, and although a logical order is shown in the flow chart, in some cases, the steps shown or described may be executed in a different order from here.

Figure 1:
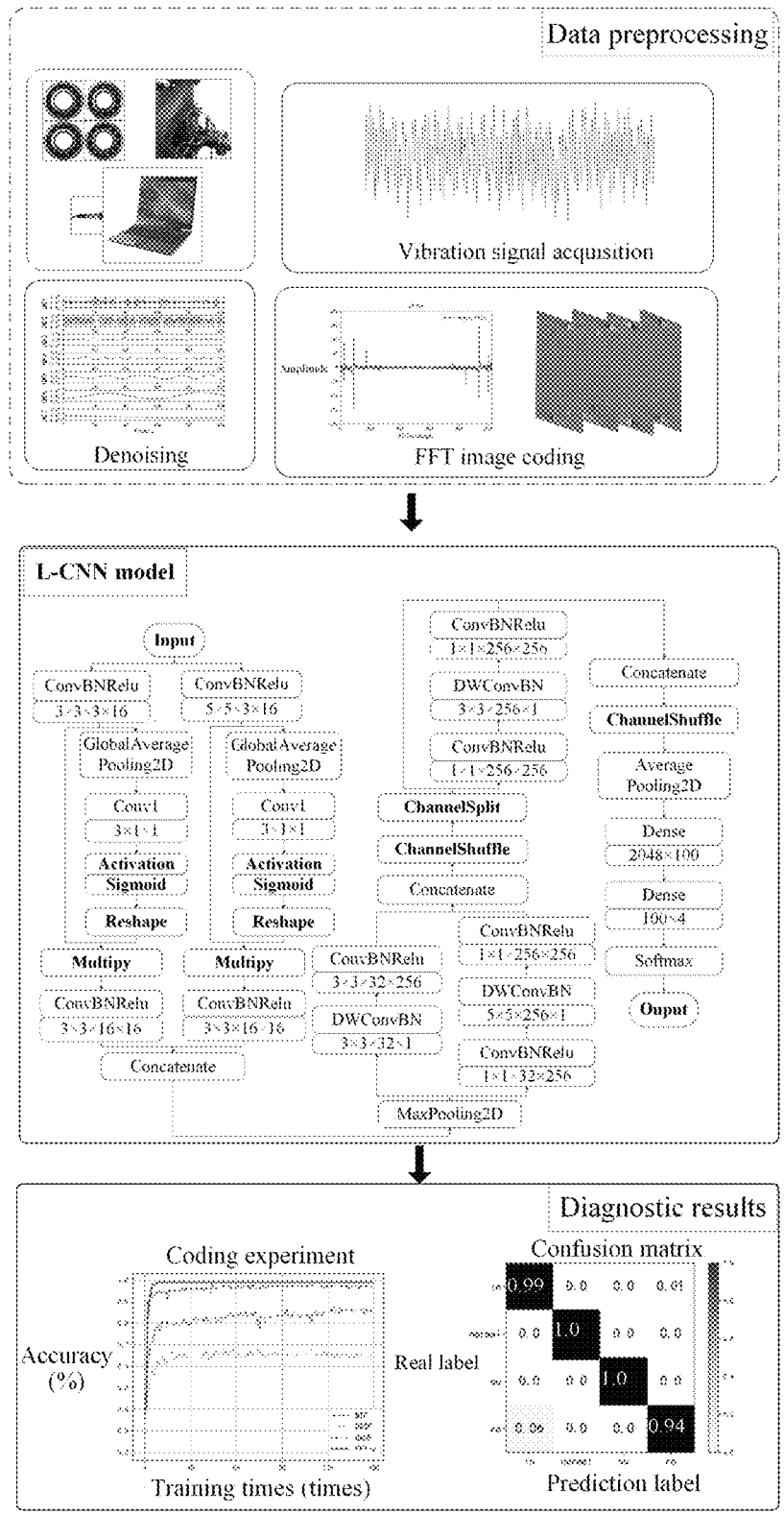
FIG. 1 is a flow chart of a rolling bearing fault diagnosis method based on FFT coding and L-CNN according to an embodiment of the disclosure.
Figure 2:
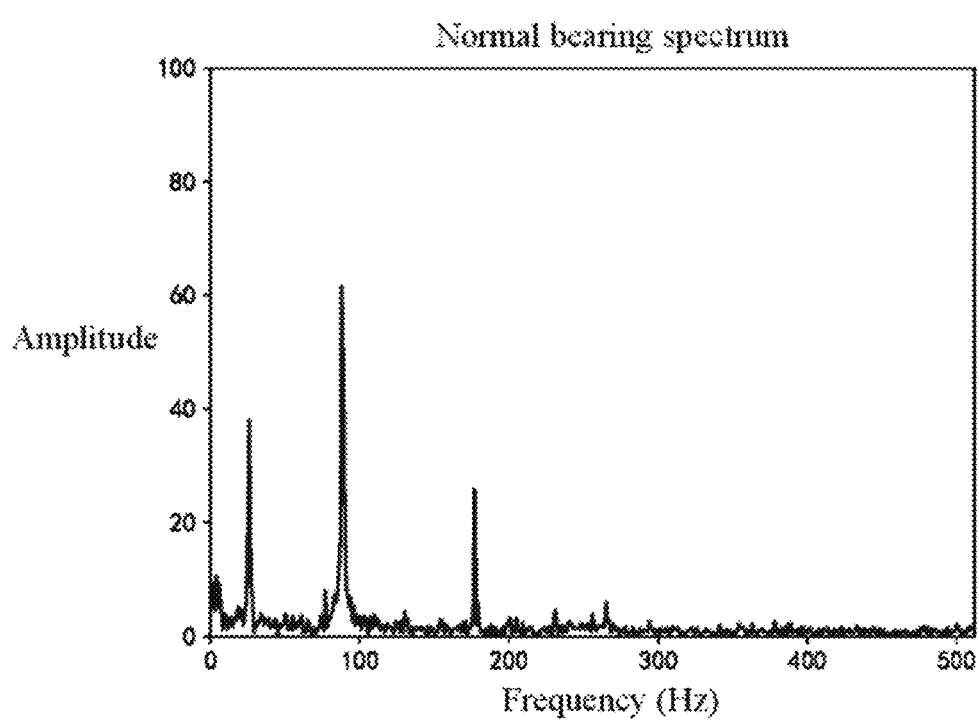
FIG. 2 is a spectrum diagram of a normal bearing according to an embodiment of the disclosure.
Figure 3:
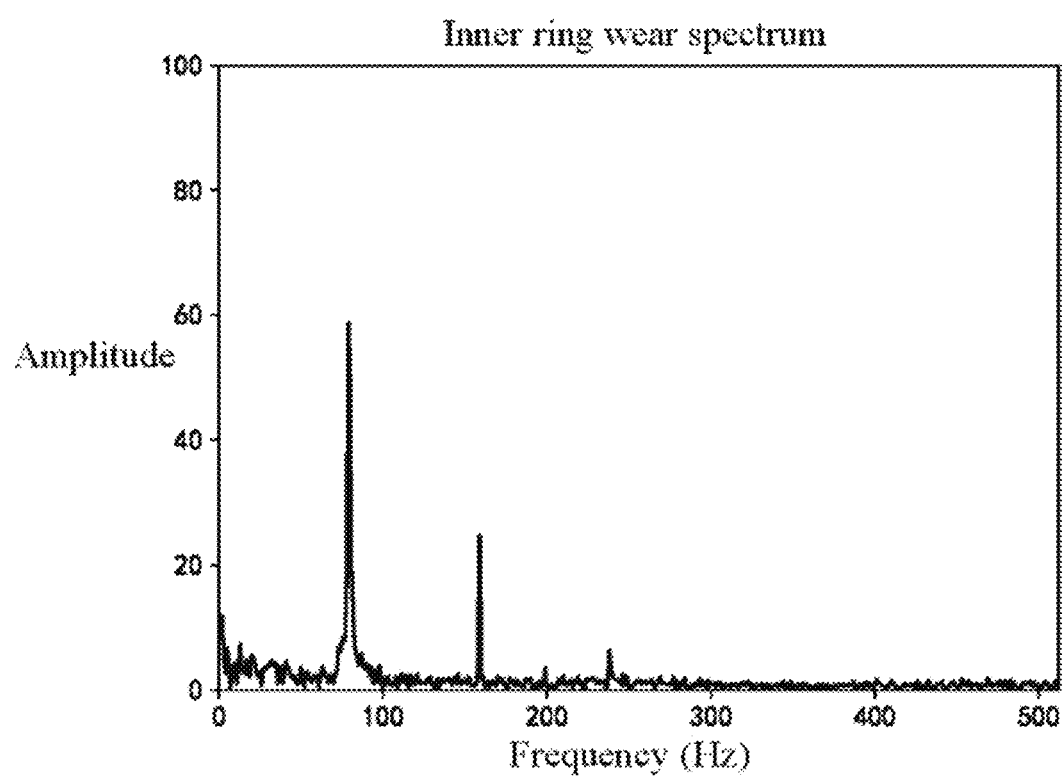
FIG. 3 is an inner ring wear spectrum diagram of an embodiment of the disclosure.
Figure 4:
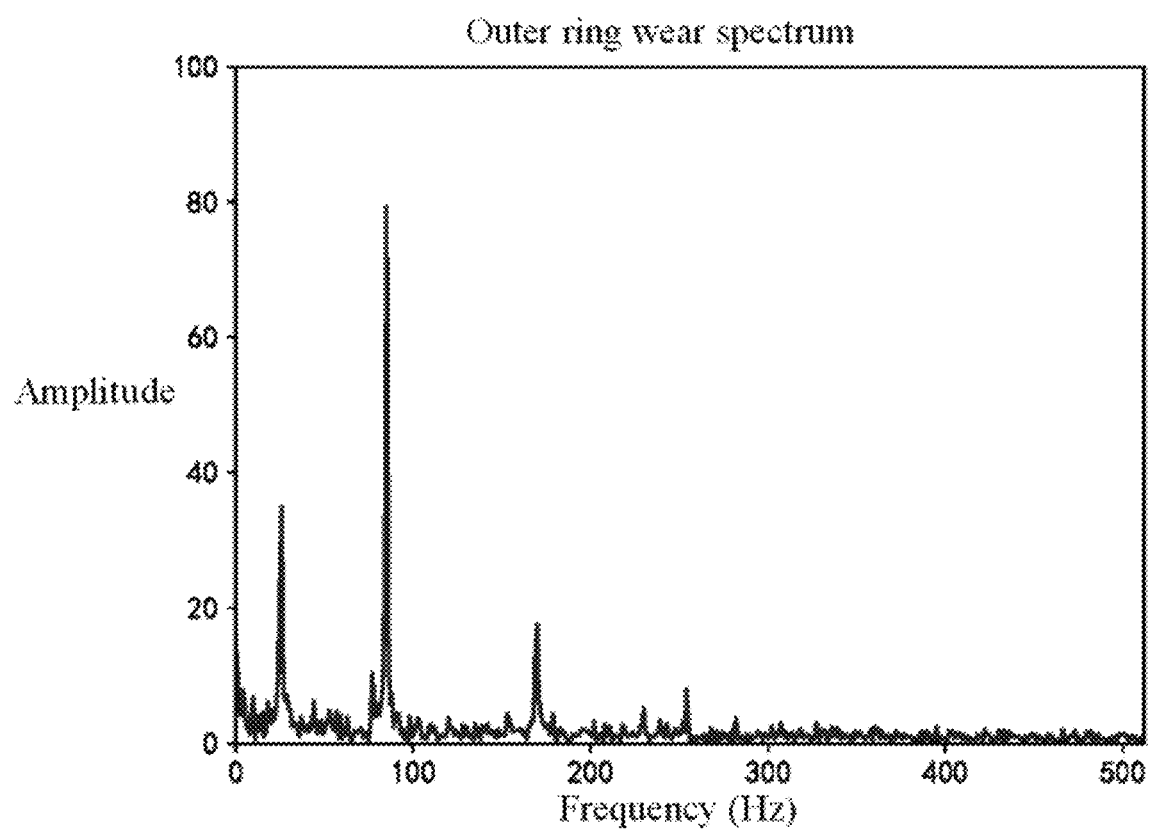
FIG. 4 is an outer ring wear spectrum diagram of an embodiment of the disclosure.
Figure 5:
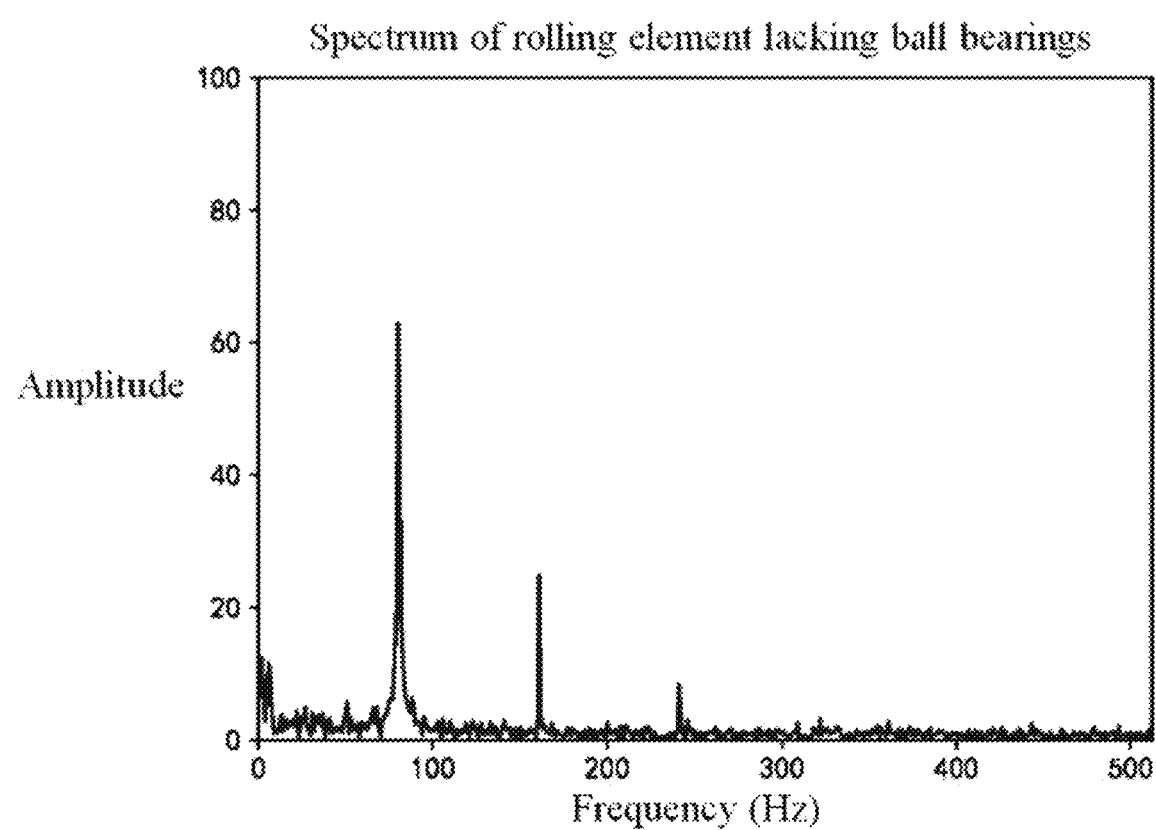
FIG. 5 is a spectrum diagram of rolling elements lacking balls according to an embodiment of the disclosure.
Figure 6:
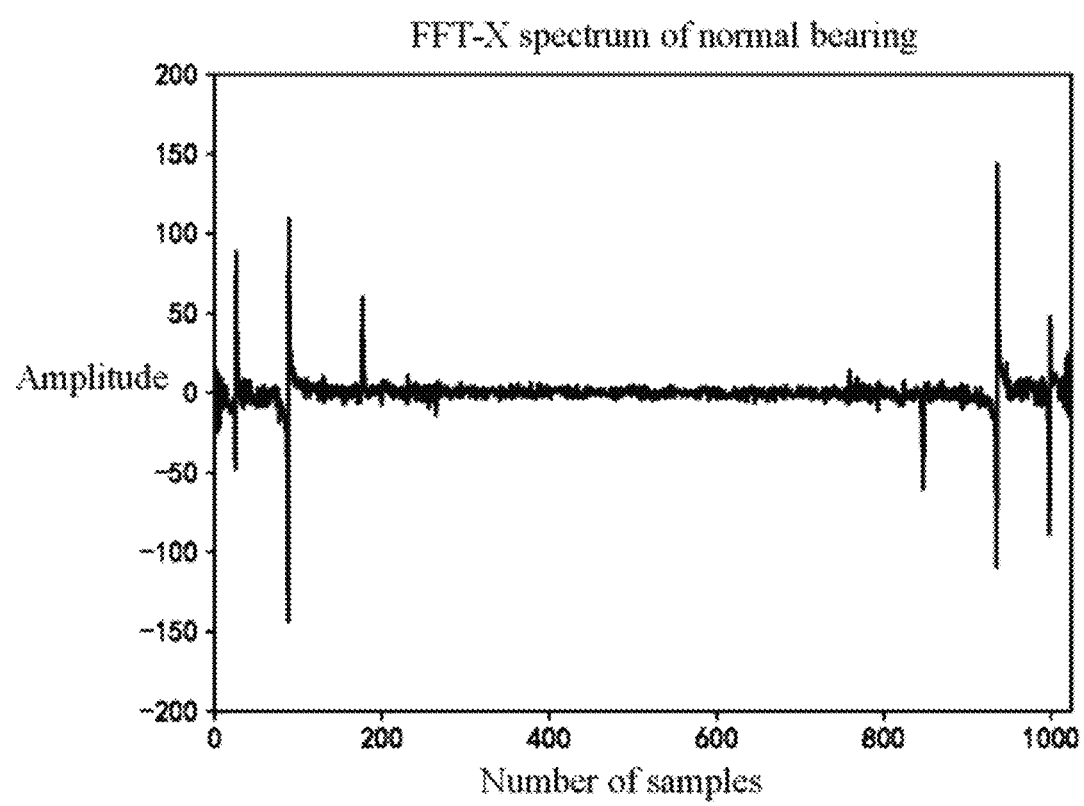
FIG. 6 is a schematic diagram of an FFT-x spectrum of the normal bearing according to an embodiment of the disclosure.
Figure 7:
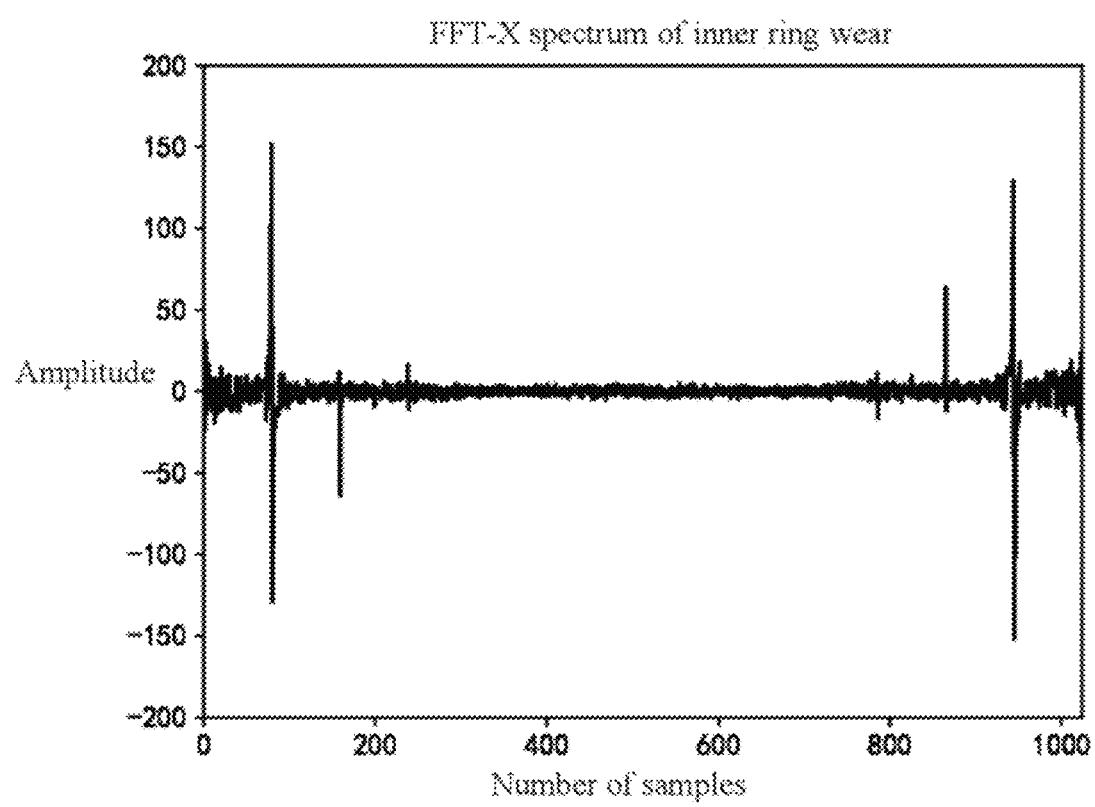
FIG. 7 is a schematic diagram of an FFT-x spectrum of inner ring wear according to an embodiment of the disclosure.
Figure 8:
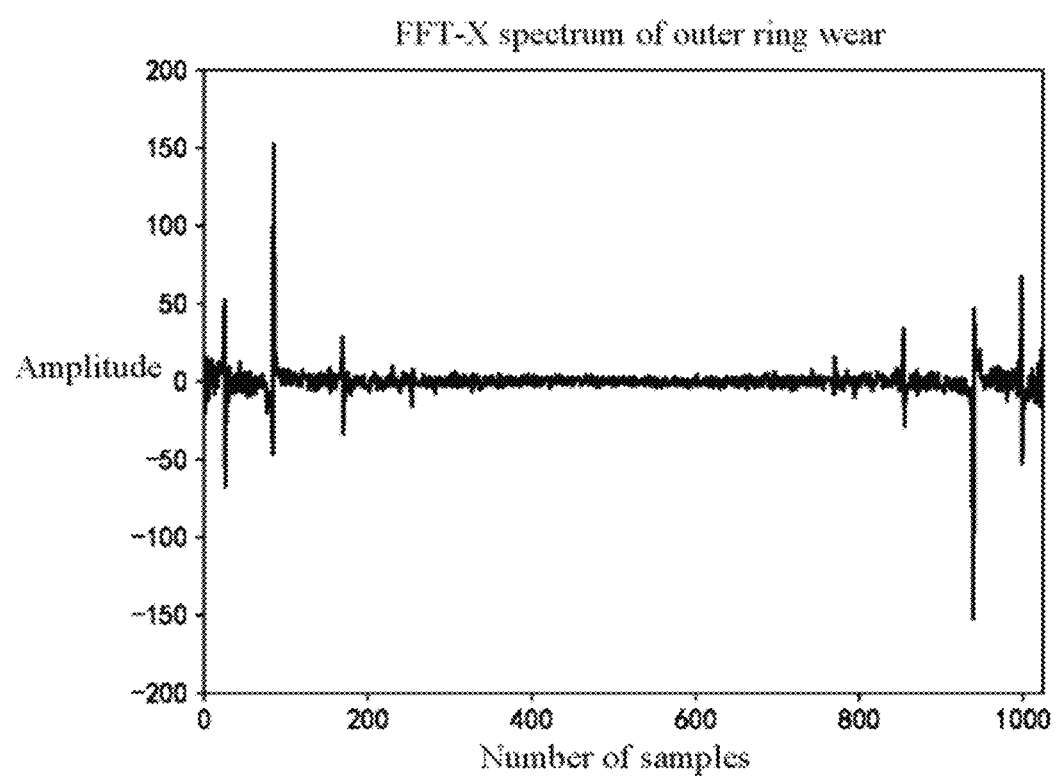
FIG. 8 is a schematic diagram of an FFT-x spectrum of outer ring wear according to an embodiment of the disclosure.
Figure 9:
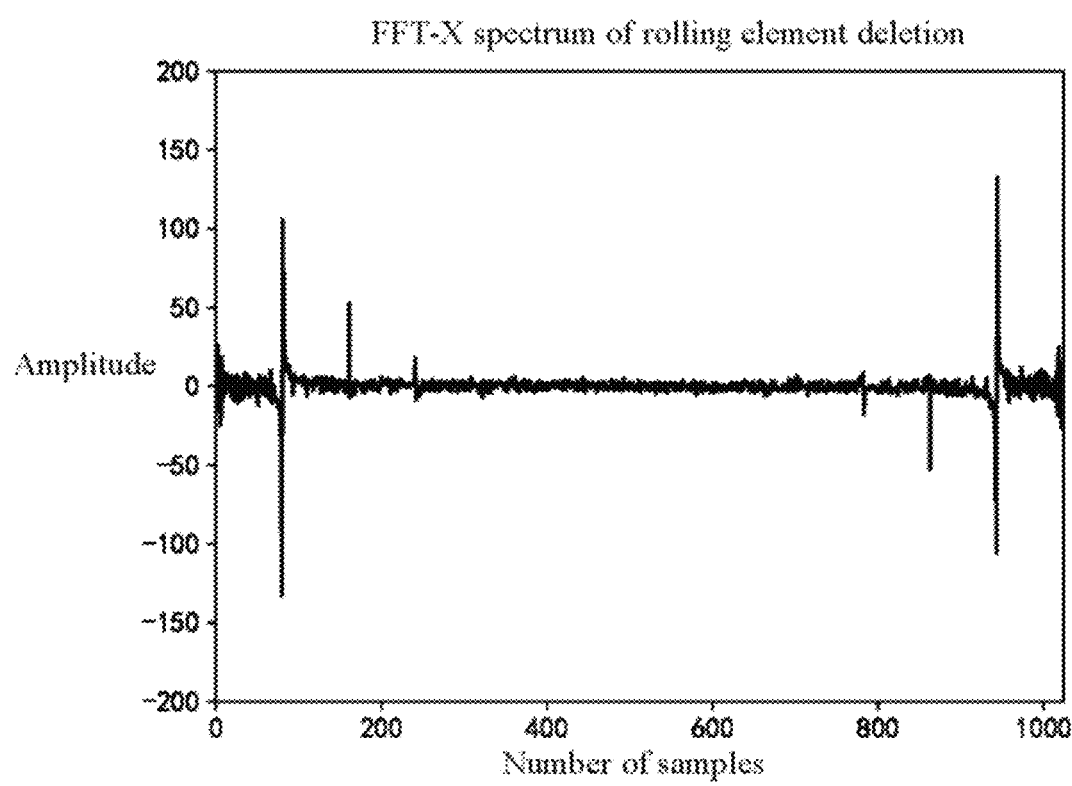
FIG. 9 is a schematic diagram of an FFT-x spectrum of rolling element deletion according to an embodiment of the disclosure.
Figure 10:
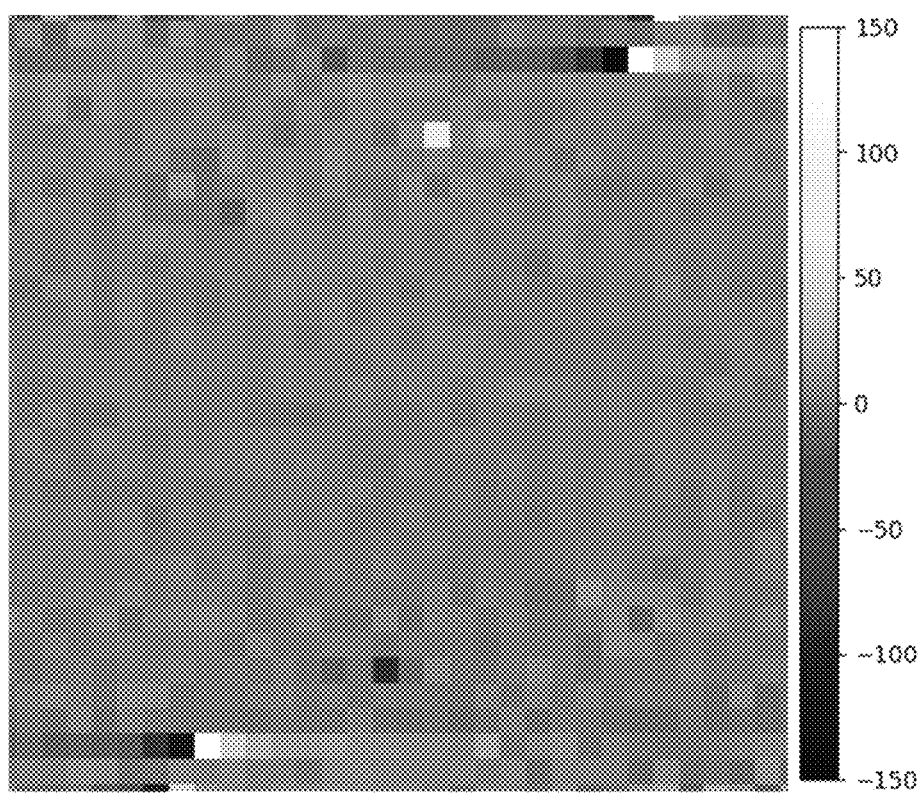
FIG. 10 is a normal bearing heat map according to an embodiment of the disclosure.
Figure 11:
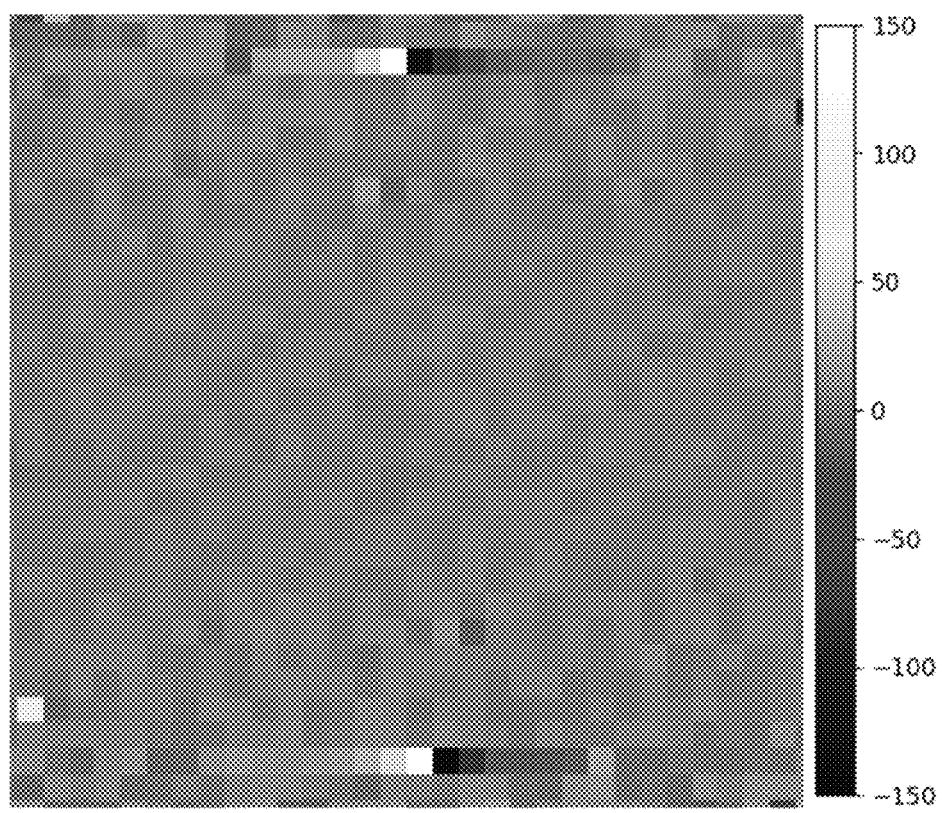
FIG. 11 is an inner ring wear heat map according to an embodiment of the disclosure.
Figure 12:
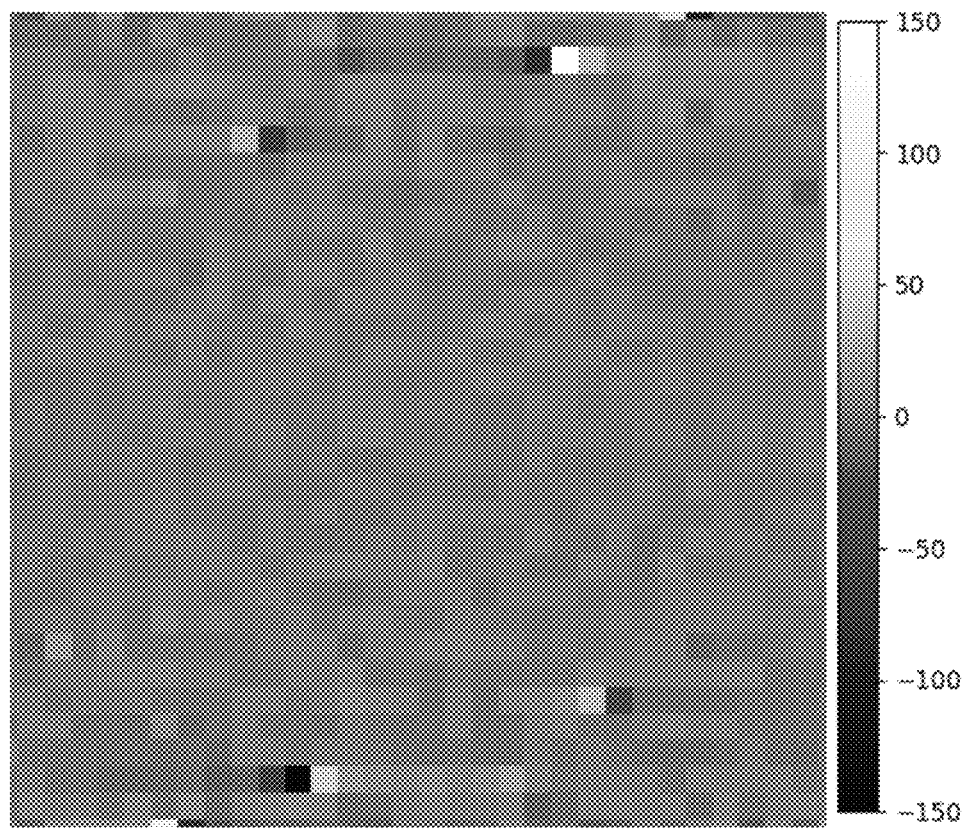
FIG. 12 is an outer ring wear heat map according to an embodiment of the disclosure.
Figure 13:
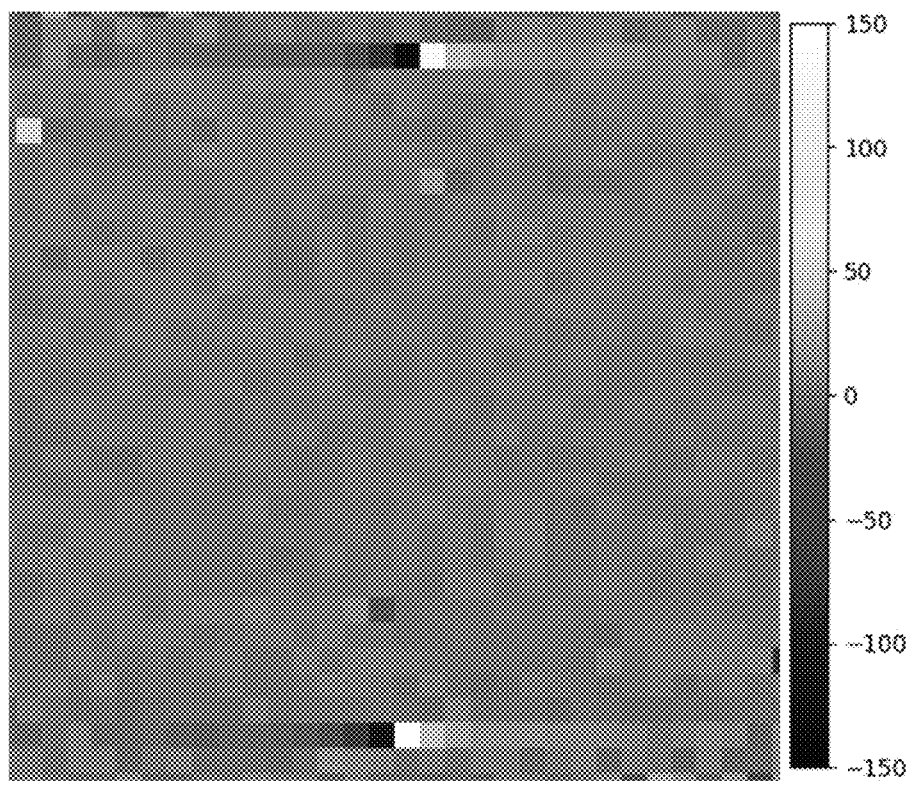
FIG. 13 is a heat map of the rolling element deletion according to an embodiment of the disclosure.

The disclosure provides a rolling bearing fault diagnosis method based on FFT coding and L-CNN, as shown in FIG. 1, including:

obtaining original bearing fault vibration data, extracting intrinsic mode components of different frequency bands in the original bearing fault vibration data, calculating a permutation entropy value corresponding to each of the intrinsic mode components, and performing wavelet threshold denoising according to the permutation entropy value to obtain a denoised reconstructed signal;

performing fast Fourier transform to the denoised reconstructed signal, obtaining frequency domain data with fused spectrum and phase angle features through the fast Fourier transform, retaining all sequence feature data to obtain FFT-x coded data of bearing vibration signals, and drawing FFT-x heat maps of different fault type data according to an amplitude range of the FFT-x coded data; and constructing an improved lightweight convolutional neural network model L-CNN, and inputting the FFT-x coded data into the L-CNN model for processing and diagnosis, and obtaining fault diagnosis results.

The method specifically includes:

1. Bearing vibration signal analysis

The main components of a rolling bearing include a bearing outer ring, a bearing inner ring, rolling elements and a cage.

When the bearing fails, the parts will collide with each other periodically at the fault point, which will lead to exponential decay oscillation and excitation of vibration frequency, where the frequency of a bearing vibration signal has a great correlation with the fault type, speed and size of the bearing. The calculation of fault feature frequency of rolling bearing feature is shown in formula (1)-formula (5):

(1) rolling bearing inner ring rotation frequency f:

$$f = n/60 \qquad (1);$$

(2) vibration frequency $f_i$ of the rolling element of the rolling bearing passing through a certain damage point on the inner ring:

$$f_i = \frac{1}{2}\left(1 + \frac{d}{D}\cos a\right)Nf; \qquad (2)$$

(3) vibration frequency $f_o$ of the rolling element of the rolling bearing passing through a damage point on the outer ring:

$$f_o = \frac{1}{2}\left(1 - \frac{d}{D}\cos a\right)Nf; \qquad (3)$$

(4) frequency $f_r$ at which a certain damage point on the rolling element of the rolling bearing passes through the inner ring or the outer ring:

$$f_r = \frac{1}{2}\frac{D}{d}\left(1 - \left|\frac{d}{D}\right|^2 \cos^2 a\right)f \quad \text{and} \tag{4}$$

(5) rolling bearing cage rotation frequency $f_b$:

$$f_b = \frac{1}{2}\left(1 - \frac{d}{D}\cos a\right)f; \tag{5}$$

in formula (1) to formula (5), d is the diameter of the rolling element, D is the pitch diameter of the bearing, a is the nominal contact angle of the bearing, N is a number of rolling elements, f is an absolute value of a difference between the rotation frequency of the inner ring and the frequency of the outer ring, and n is a vibration order.

The fault frequency feature of rolling bearing feature is an important basis for diagnosis through bearing vibration signals.

2. Complete ensemble empirical mode decomposition with adaptive noise-permutation entropy-wavelet threshold denoising (CEEMDAN-PE-WTD) denoising method CEEMDAN may effectively extract the intrinsic mode functions (IMFs) of bearing vibration signals in different frequency bands, and each IMF represents different vibration features, which may better realize the time-frequency analysis of bearing vibration signals.

The steps of CEEMDAN are as follows:

(1) adding Gaussian white noises with normal distribution to original bearing vibration data to obtain an i-th signal $y_i(t)$, as shown in formula (6):

$$y_i(t) = y(t) + \beta_0 \omega_i(t), t = 1, 2, \ldots, n \tag{6}$$

where $y(t)$ is the original bearing vibration data, and $\beta_0$ is a standard deviation of the Gaussian white noises; $\omega_i(t)$ is Gaussian white noises; and n is a number of bearing signal data samples;

(2) decomposing $y_i(t)$ by EMD to obtain a first intrinsic mode function $IMF_1(t)$ and a residual component $r_1(t)$ of $y_i(t)$:

$$IMF_1(t) = \sum_{i=1}^{I} IMF_i(t) \tag{7}$$

$$r_1(t) = y(t) - IMF_1(t) \tag{8}$$

where I is a number of times the noise is added;

(3) decomposing the reconstructed $r_1(t) + \beta_1 E_1(\omega_i(t))$ with $r_1(t)$ as the original data to obtain a second mode function $IMF_2(t)$ and a residual component $r_2(t)$:

$$IMF_2(t) = \frac{1}{I}\sum_{i=1}^{I} E_1(r_1(t) + \beta_1 E_1(\omega_i(t))) \tag{9}$$

$$r_2(t) = r_1(t) - IMF_2 \tag{10}$$

(4) repeating (3) to obtain a (k+1)-th mode function $IMF_{k+1}(t)$ and a k-th residual component $r_k(t)$:

$$IMF_{k+1}(t) = \frac{1}{I}\sum_{i=1}^{I} E_1(r_k(t) + \beta_k E_k(\omega_i(t))); \tag{11}$$

$$r_k(t) = r_{k-1}(t) - IMF_k(t) \tag{12}; \text{ and}$$

(5) decomposing the bearing vibration signal into:

$$y(t) = \sum_{k=1}^{k} IMF_k(t) + r_k(t). \tag{13}$$

Due to the influence of external environment, bearing's own factors and the noise of signal-noise acquisition equipment itself, it is inevitable that bearing vibration data set has noise. There is a need to use noise analysis technology and denoising algorithm to process the data and extract effective information. After the signal is decomposed by CEEMDAN, the permutation entropy (PE) value of each IMF is calculated, and PE is a parameter to measure the randomness of IMF. By calculating the PE value $H_{pe}(m)$ of IMF, the noisy level of each IMF is judged. According to the noisy level, IMFs are divided into effective IMFs and noisy IMFs, and wavelet coefficients of the noisy IMFs are calculated by wavelet decomposition, and the wavelet coefficients less than a certain threshold are set to zero to achieve the objective of denoising.

Firstly, a group of IMFs with length N are reconstructed in phase space to obtain a matrix Y.

$$Y = \begin{bmatrix} x(1) & x(1+t) & \ldots & x(1+(m-1)t) \\ x(2) & x(2+t) & \ldots & x(2+(m-1)t) \\ x(j) & x(j+t) & \ldots & x(j+(m-1)t) \\ \vdots & \vdots & \vdots & \vdots \\ x(j) & x(K+t) & \ldots & x(K+(m-1)t) \end{bmatrix} \tag{14}$$

where m is an embedding dimension, t is a delay time, and K is a number of reconstructed components.

Secondly, the reconstructed components are rearranged in ascending order, and then the frequency of each symbol sequence divided by the total frequency of m! different symbol sequences is calculated as the probability PP of the symbol sequence.

The calculation formula of IMF permutation entropy is as follows:

$$H_{pe}(m) = -\sum_{m!} P_j \log(P_j) \tag{15}$$

$$0 \leq H_{pe}(m) = \frac{H_{pe}}{\ln(m!)} \leq 1 \tag{16}$$

where $\ln(m!)$ is a maximum value of permutation entropy. The smaller the entropy $H_{pe}(m)$ is, the less noise IMF contains. On the contrary, IMF contains more noise. According to the data features of noisy IMFs, appropriate wavelet bases and decomposition layers are selected to decompose the noisy signals and calculate wavelet coefficients, as shown in formula (17):

$$I_{CWT}(a, b) = \frac{1}{\sqrt{a}} \int x(t)\phi\left(\frac{t-b}{a}\right) dt \tag{17}$$

where $I_{CWT}$ is the wavelet coefficient, a is the scale function and b is the position function.

Then, the Sqtwolog threshold is selected to calculate the threshold th corresponding to each wavelet coefficient, and the wavelet coefficients are quantized. The specific formula is as follows:

$$th = \frac{mid}{0.6745}\sqrt{2\ln N} \qquad (18)$$

where mid is the middle value of the coefficients of each frequency band after decomposition, and N is the length of wavelet coefficients.

Threshold function:

$$\tilde{\omega}_{k,j} = \begin{cases} \omega_{j,k} - ath, & \omega_{j,k} \geq th \\ 0, & |\omega_{j,k}| < th \\ \omega_{j,k} + ath, & \omega_{j,k} \leq -th \end{cases} \qquad (19)$$

where $\omega_{j,k}$ is the wavelet coefficient; when a=0, the function is a hard threshold function, and when a=1, the function is a soft threshold function.

Finally, the quantized wavelet coefficients are subjected to inverse wavelet transform to obtain a denoised IMFs, and then the bearing vibration signals are reconstructed from the effective IMFs and the denoised IMFs.

3. Fast Fourier transform coding

Frequency domain analysis is an essential part of signal feature analysis. In order to analyze CEEMDAN-PE-WTD denoising and reconstruct signal features, the signal is decomposed into several single harmonic components by discrete Fourier transform, and the relationship between amplitude, phase, power and frequency domain of each harmonic of the signal is obtained. When calculating discrete Fourier transform, the input sequence is divided into two subsequences with even position and odd position based on divide-and-conquer strategy and symmetry property, and each time domain point is weighted and the products of sine and cosine functions are summed.

The expression of discrete Fourier transform for time series data x(n) is:

$$x(n) = \{x_0, x_1, \ldots x_{N-1}\}, \ 0 \leq n < N \qquad (20)$$

$$\hat{x}(k) = \sum_{n=0}^{N-1} x(n)e^{-i\frac{2}{N}nk}, \qquad (21)$$

where e is a base of natural logarithm; i is an imaginary unit; k=0, 1, . . . , N−1.

FFT decomposes the discrete Fourier transform into the product of sparse factors, calculates the discrete Fourier transform quickly, and reduces the discrete Fourier transform that originally needed the time complexity of O(N^2) to the time complexity of O(NlogN), which greatly improves the calculation efficiency. The expressions of bearing frequency domain data f(x) and phase angle θ are calculated from the real part R and imaginary part I of fast Fourier transform data:

$$f(x) = \sqrt{R^2 + I^2} \qquad (22)$$

$$\theta = \text{acrtan } R/I \qquad (23)$$

The spectra of four types of bearing vibration data obtained by FFT are shown in FIG. 2, FIG. 3, FIG. 4 and FIG. 5.

FFT-based coding is a method to extract and represent the characteristics of bearing frequency domain signals by image processing technology. In order to better express the frequency domain characteristics of bearing vibration signals, firstly, there is a need to remove the direct current component from the time domain signals by removing mean and normalizing, and then obtain the frequency domain data with fused spectrum and phase angle features through fast Fourier transform. Finally, the FFT-x spectrum of bearing vibration signals is obtained by retaining all the sequence feature data. According to the quadrant where the phase angle θ is located, the direction of bearing frequency domain data f(x) is determined, and the expression of feature fusion data F(x) is as follows:

$$F(x) = \begin{cases} f(x) & \theta > 0 \\ -f(x) & \theta < 0 \end{cases}. \qquad (24)$$

FFT-x spectra of four types of bearings are shown in FIG. 6, FIG. 7, FIG. 8 and FIG. 9.

When drawing a heat map, the FFT-x data are divided into multiple FFT-x data according to the window sliding, and the two-dimensional array is reconstructed. The values of the two-dimensional array are mapped to the color map, and the size of each element in the array is represented by color. The vertical and horizontal coordinates of the heat map are determined by the row and column indexes of the FFT-x reconstructed array. The "imshow ( )" function is used in the Matplotlib library, the color is set to "hot" and the range is set to (−150,150), and the dpi parameters are modified to adjust the image resolution to make the image clearer. In this way, through the difference of color distribution in FFT heat map, the amplitude difference corresponding to the fusion feature data FFT-x of different types of bearings may be intuitively displayed, which lays a solid foundation for the subsequent fault diagnosis work. The FFT-x heat maps of different fault type data are shown in FIG. 10, FIG. 11, FIG. 12 and FIG. 13.

Figure 14:
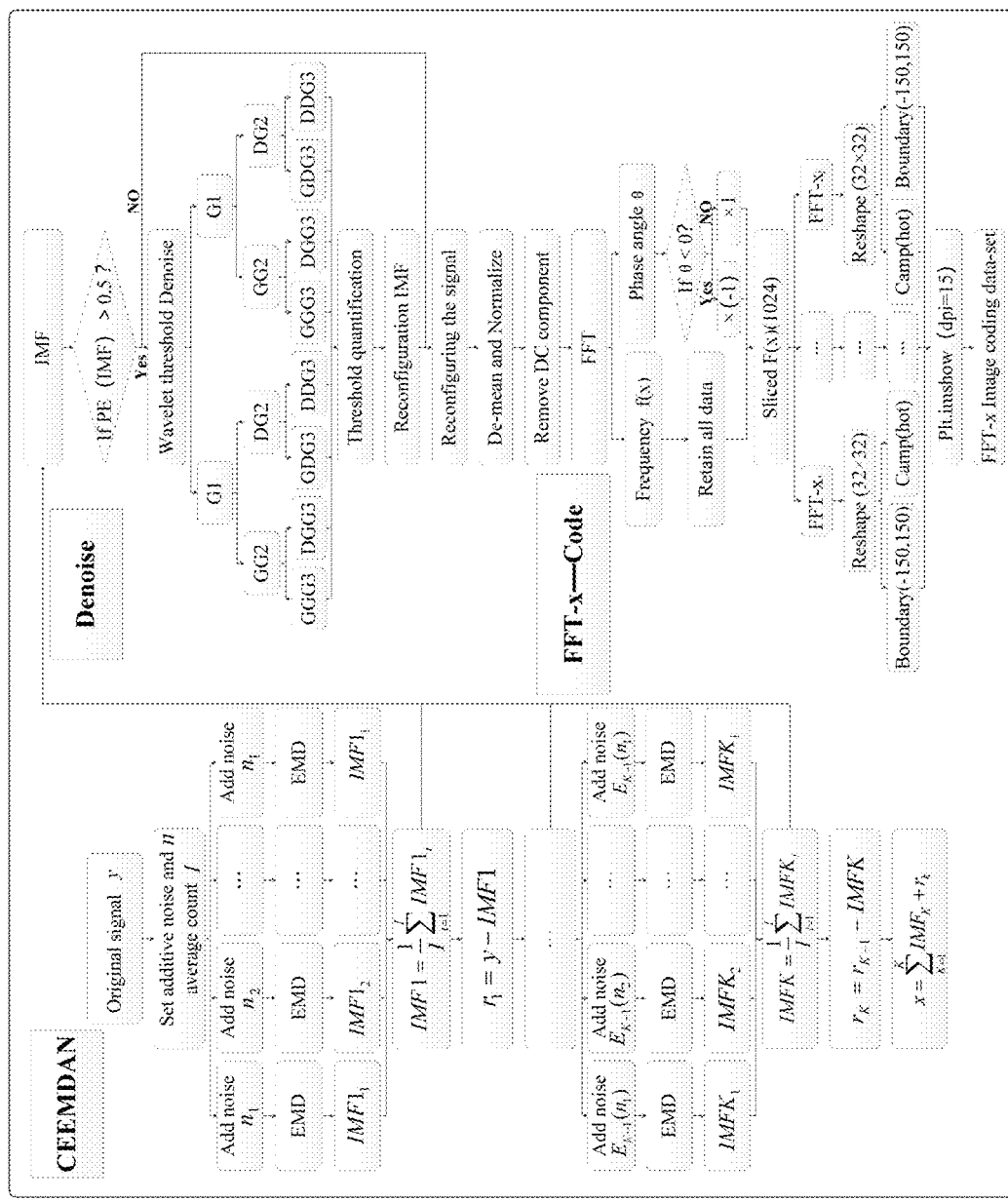
FIG. 14 is a flow chart of complete ensemble empirical mode decomposition with adaptive noise-permutation entropy-wavelet threshold denoising-fast Fourier transform-x (CEEMDAN-PE-WTD-FFT-x) coding according to an embodiment of the disclosure.

The flow of CEEMDAN-PE-WTD-FFT-x coding method is shown in FIG. 14.

4. Lightweight convolutional neural network

Figure 15:
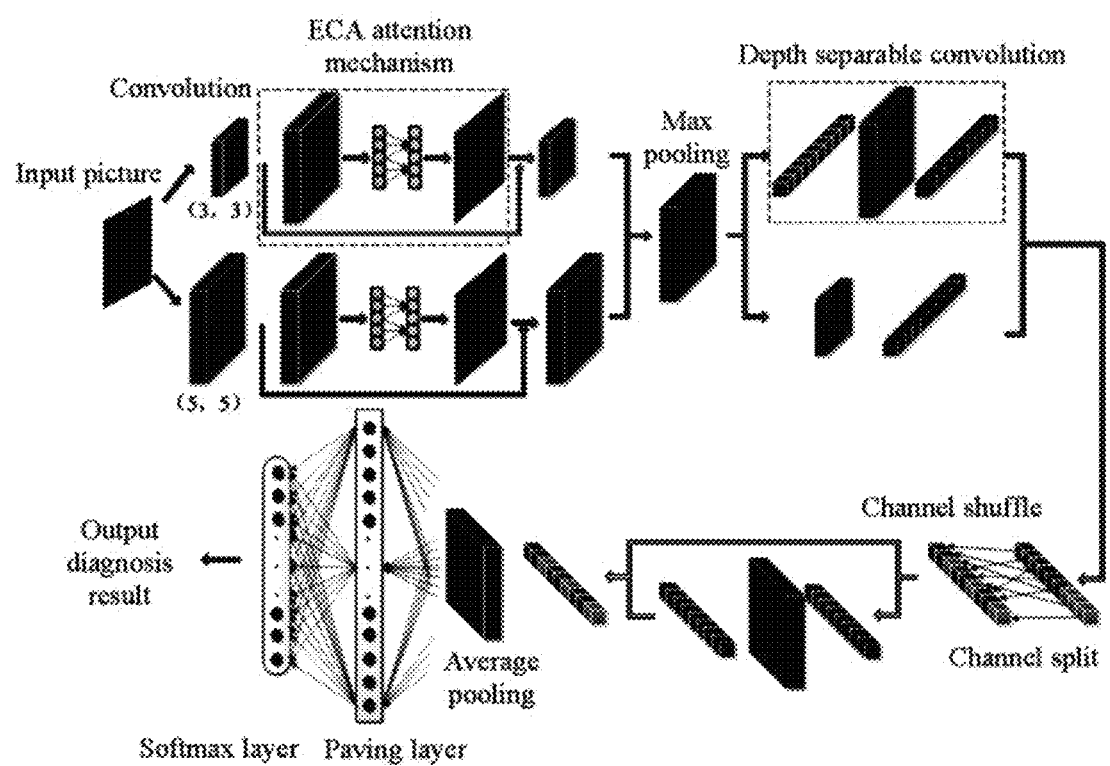
FIG. 15 is a structural diagram of an L-CNN model according to an embodiment of the disclosure.
Figure 16A:
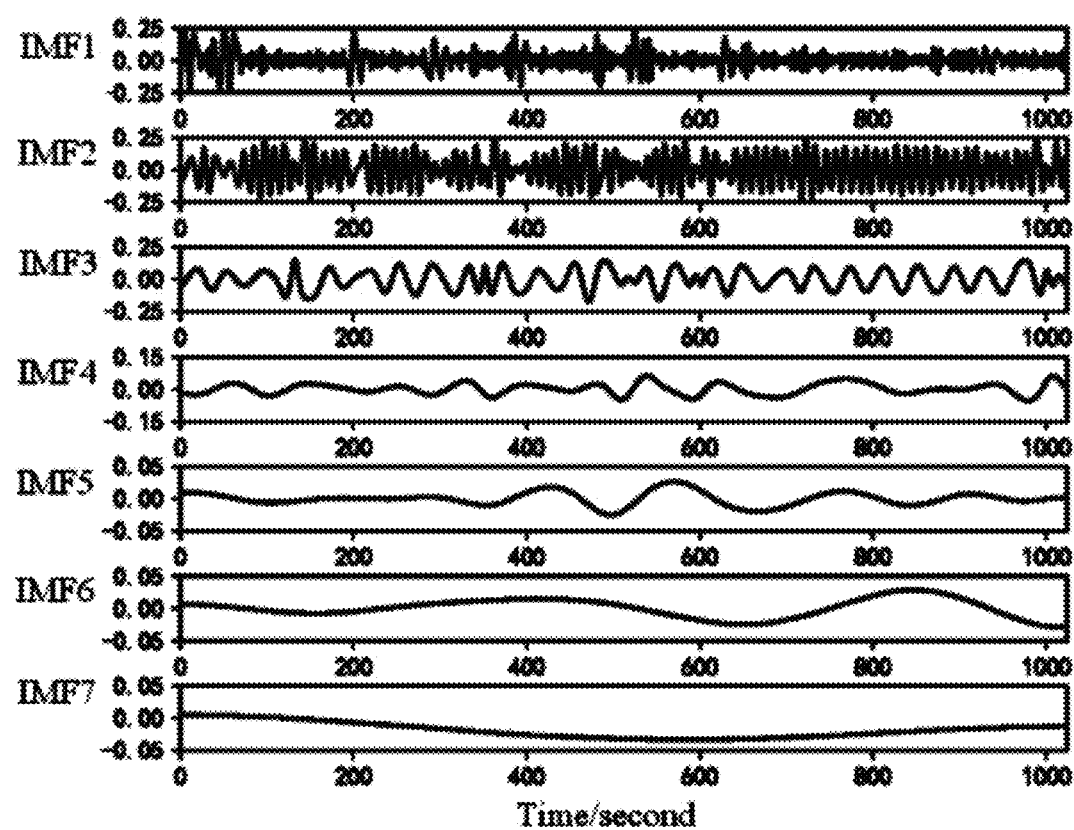
FIG. 16A is a CEEMDAN decomposition view of a normal bearing signal according to an embodiment of the disclosure.
Figure 16B:
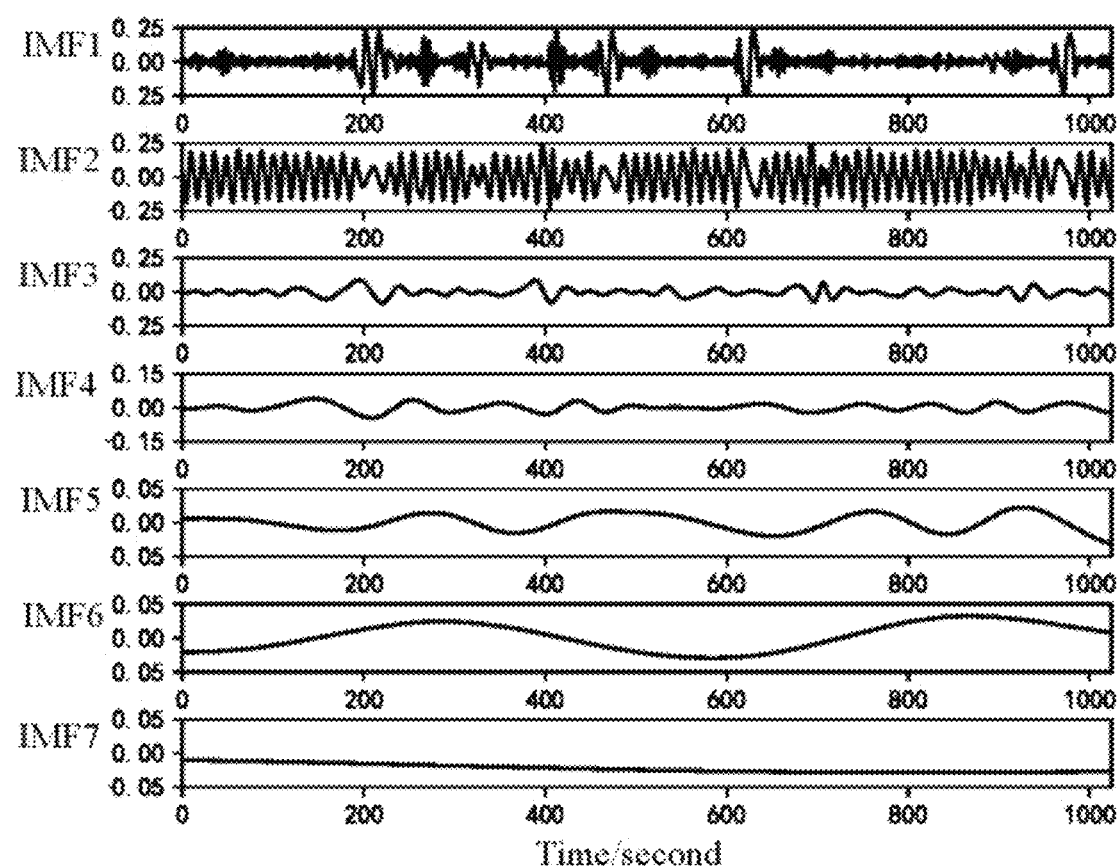
FIG. 16B is a CEEMDAN decomposition view of a bearing inner ring fault signal according to an embodiment of the disclosure.
Figure 16C:
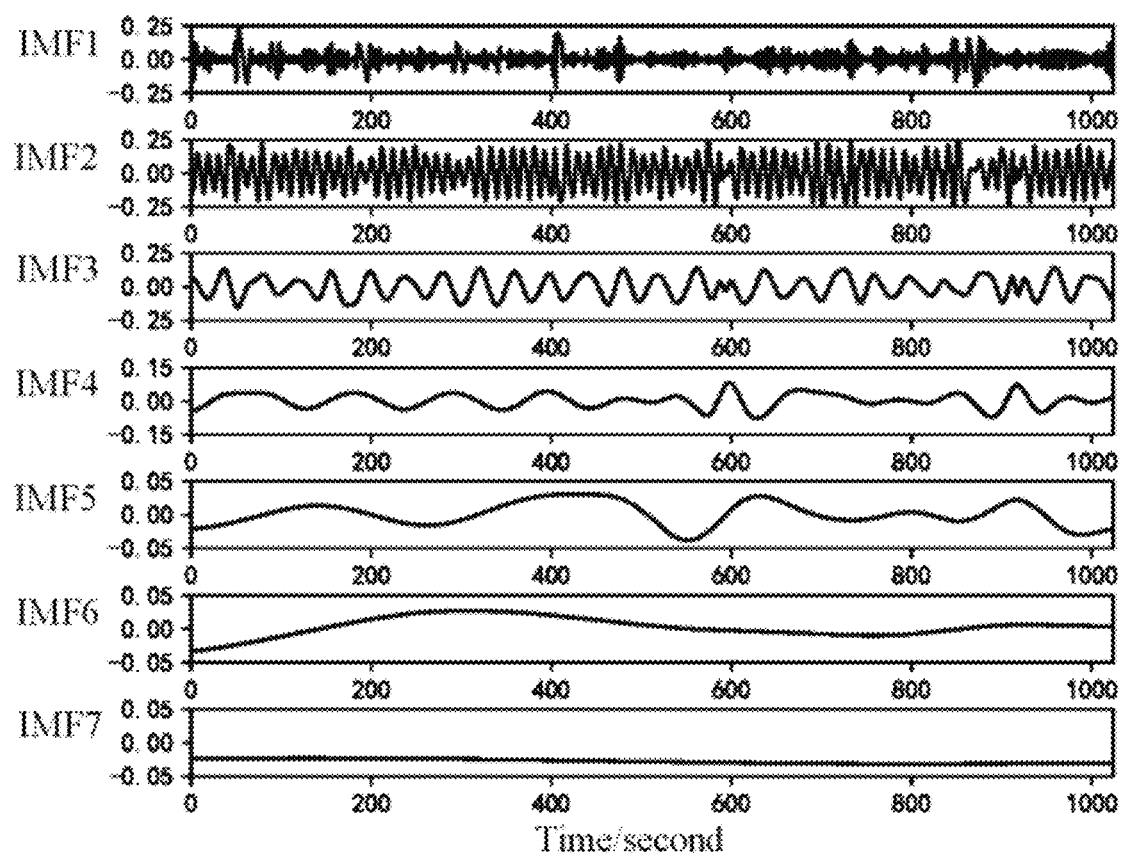
FIG. 16C is a CEEMDAN decomposition view of a bearing outer ring fault signal according to an embodiment of the disclosure.
Figure 16D:
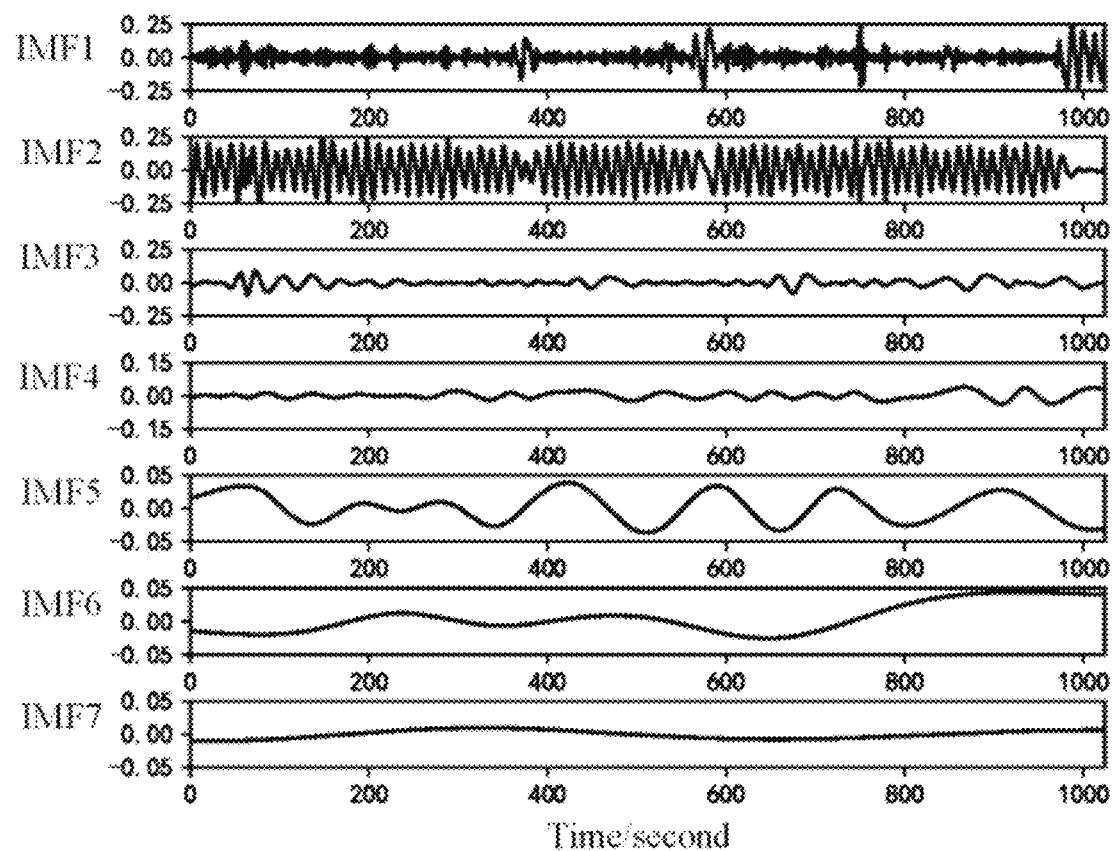
FIG. 16D is a CEEMDAN decomposition view of a bearing rolling element fault signal according to an embodiment of the disclosure.
Figure 17A:
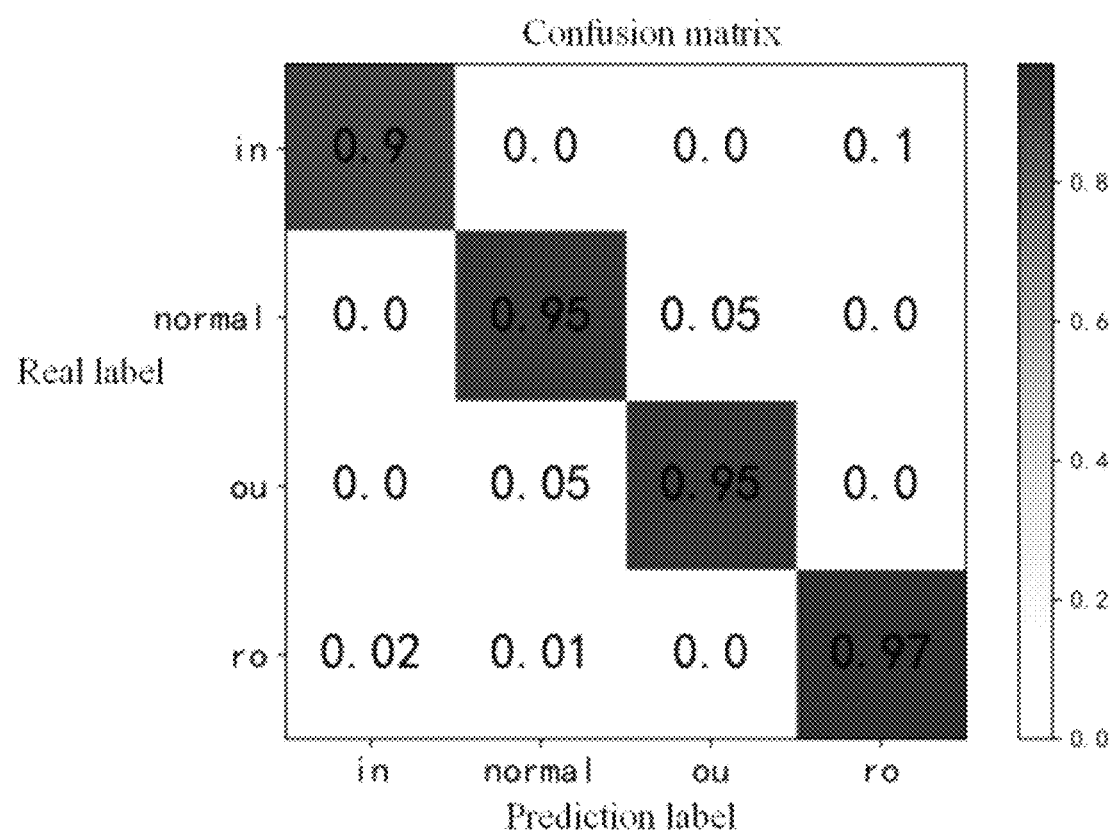
FIG. 17A is a gram's angular difference field (GADF) coding diagram according to an embodiment of the disclosure.
Figure 17B:
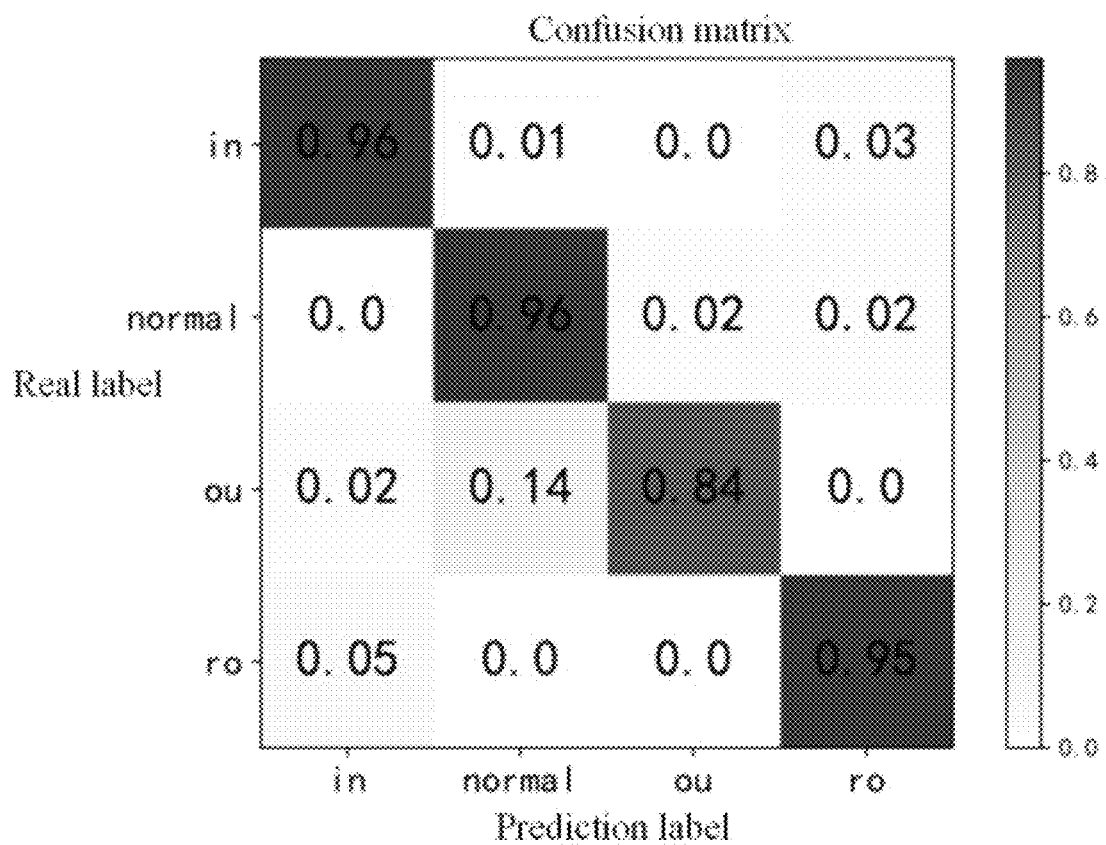
FIG. 17B is a gram's angular sum field (GASF) coding diagram according to an embodiment of the disclosure.
Figure 17C:
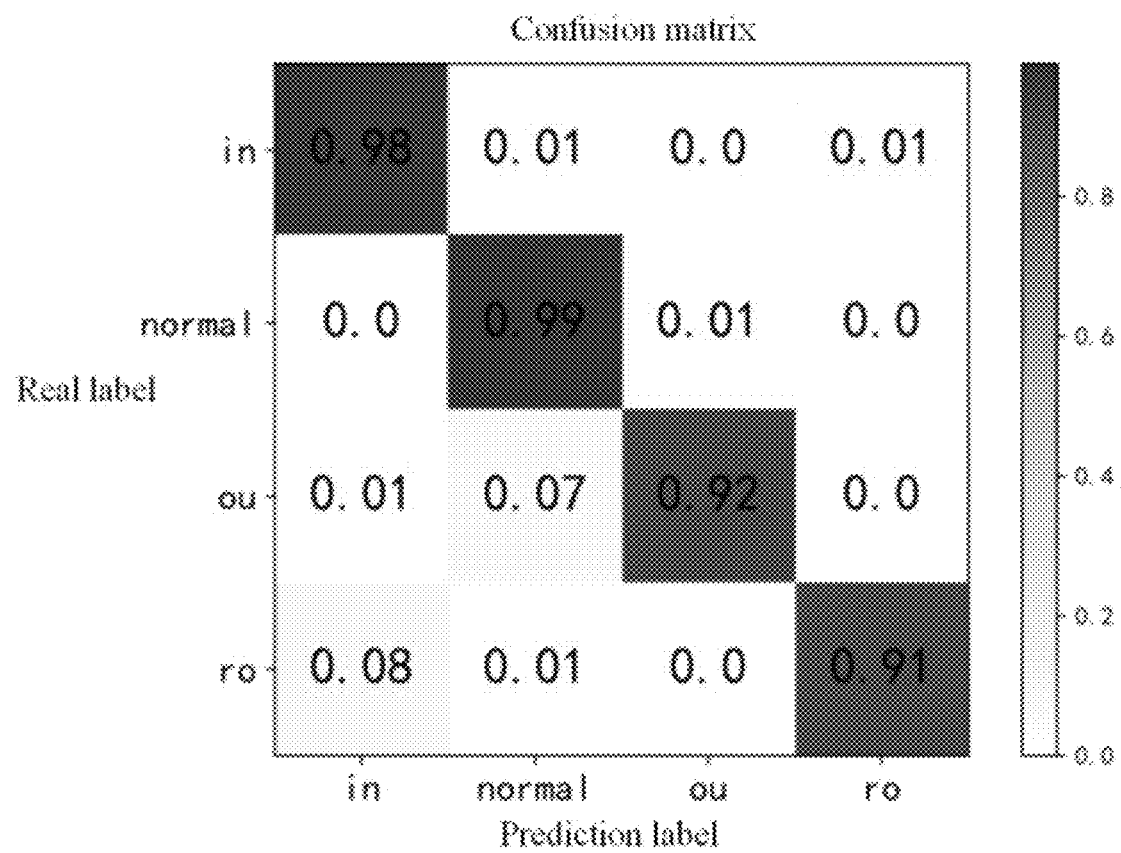
FIG. 17C is a move-to-front (MTF) coding diagram according to an embodiment of the disclosure.
Figure 17D:
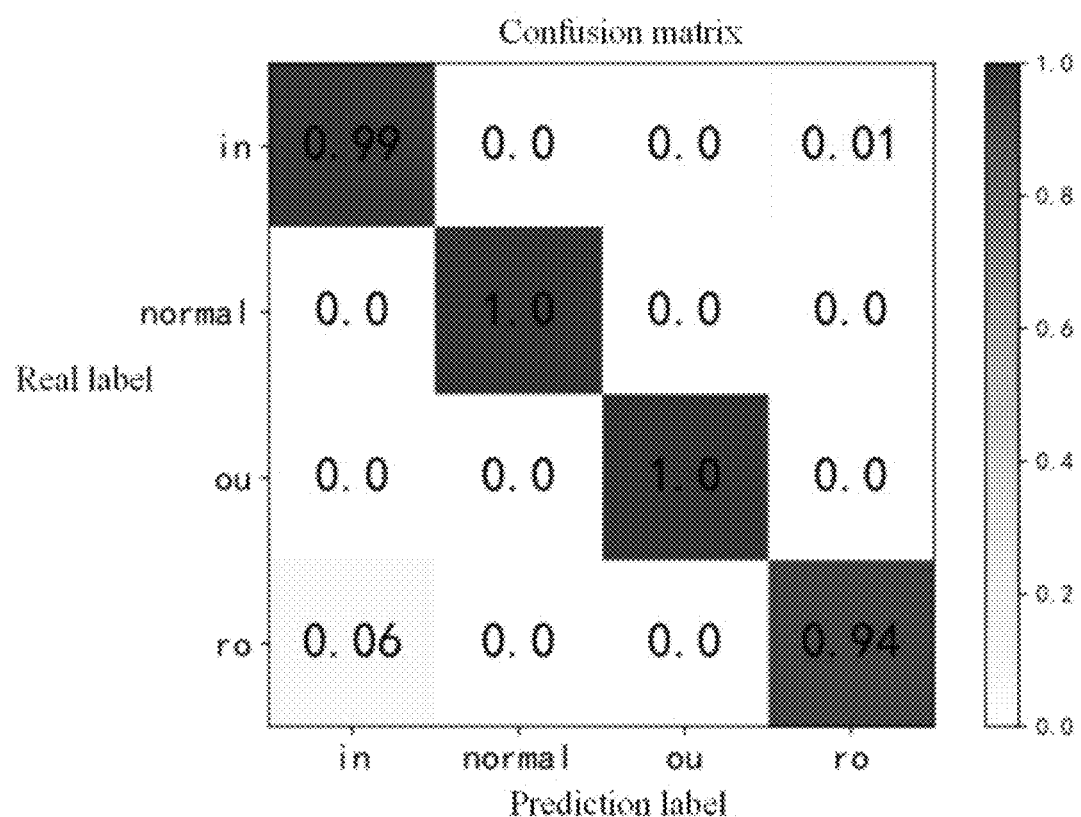
FIG. 17D is an FFT-x coding diagram according to an embodiment of the disclosure.

Convolutional neural network uses convolution kernels to extract data features, and is a feedforward neural network and one of the representative algorithms of deep learning. In the fault diagnosis method of fault bearing based on fast Fourier coding and lightweight convolutional neural network, in order to extract signal features more accurately and efficiently, the improved L-CNN model diagnosis is used to diagnose the fault signal data of rolling bearings. L-CNN maps the original data to the feature space of the hidden layer through multi-scale convolution, ECA attention mechanism, depth separable convolution, ShuffleNet and other network structures, and automatically extracts features from complex data. Compared with manual extraction, feature extraction is more accurate, faster and more accurate in data classification. The model structure is shown in FIG. 15.

Firstly, the FFT-x coded data set is input into the L-CNN model, and the convolution kernels with 3×3 and 5×5 sizes are used to capture the features of different levels of the input data from different scales. The captured features are weighted for the importance of each channel by structures such as global average pooling, one-dimensional convolution, channel multiplication and spatial replication through the ECA attention mechanism, which improves the perception ability of different sizes or levels of the model and the feature extraction ability of convolution module. Secondly, the channel dimension and spatial dimension of input features are processed by depth separable convolution, which may enhance the ability of model feature extraction, reduce the amount of parameters and calculation, and improve the efficiency of model calculation. Then, a ChannelSplit module and a Channelshuffle module are used to exchange the channel sequence of the input feature map between different depths and different groups, change the channel arrangement mode, improve the diversity of features, and further extract data features through residual and depth separable convolution. Finally, the fault diagnosis results are output through average pooling and two fully connected layers.

The model uses an adaptive moment estimation (Adam) optimizer, and the model weight training and updating formula is:

$$w_t = w_{t-1} - lr * \frac{\hat{m}_t}{\sqrt{\hat{v}_t} + \varepsilon} \quad (25)$$

where w represents the model weight, t represents the number of times, $\hat{m}_t$ is the correction of $m_t$, and $\hat{v}_t$ is the correction of $v_t$.

$$\hat{m}_t = \frac{m_t}{1 - \beta_1^t}, \quad (26)$$

$$\hat{v}_t = \frac{v_t}{1 - \beta_2^t}, \quad (27)$$

where $\beta_1$, $\beta_2$ are constants, which control the exponential decay, and $m_t$ is the exponential moving value of the gradient, which is obtained by the first derivative of the gradient; and $v_t$ is obtained by the second moment of gradient.

$$m_t = \beta_1 * m_{t-1} + (1-\beta_1) * g_t \quad (28)$$

$$v_t = \beta_2 * v_{t-1} + (1-\beta_2) * g_t^2 \quad (29)$$

Assuming $\beta_1 = 0.9$, $\beta_2 = 0.999$, and the learning rate $l_r$ is 0.001, the weight and bias of the whole model are optimized and the loss of model classification is reduced by Adam back propagation.

An objective function of the model is evaluated as the cross entropy loss function:

$$Loss = -\sum_{i=1}^{output\ size} y_i \cdot \log \hat{y}_i, \quad (30)$$

where Loss is the model loss value, $y_i$ is the model fault classification prediction value, and $\hat{y}_i$ is the model classification true value.

5. Verification

In this part, two data sets are used to verify the feasibility and generalization ability of CEEMDAN-PE-WTD denoising method, fast Fourier transform image coding and lightweight convolutional neural network model for rolling bearing fault diagnosis. All the experimental codes are written in python3.7 in Pycharm, and the environment is configured as tensorflow2.6.0. The experiments are carried out on a computer equipped with central processing unit (CPU) (Intel (R) Core (TM) i5-12490F @ 3.00 GHz) and General Processing Unit (GPU) (NVIDIAGeForceRTX3060Ti8G).

In order to verify the superiority of the rolling bearing fault diagnosis method based on FFT coding and L-CNN, the bearing fault data collected from the fault diagnosis platform of multi-stage centrifuge of large petrochemical rotating machinery in Guangdong Petrochemical Equipment Key Laboratory is adopted. The rotating speed of these faulty bearings reaches 1024 revolutions per minute (r/min), and the sampling frequency is set at 1024 hertz (Hz). An EMT390 sensor is used to collect 1,024,000 vibration signal samples for each of the four bearing fault types: normal bearing, bearing inner ring wear, bearing outer ring wear and rolling element deletion. These samples are used in data denoising experiment, data coding experiment, model comparison experiment, ablation experiment and diagnosis method comparison experiment.

In order to further verify the generalization ability of the algorithm model, the open source data set of bearing fault in Western Reserve University is selected for experiments. The bearing vibration data with 0.007 inch fault diameter at the driving end, sampling frequency of 12 kilohertz (KHz), motor speed of 1797 r/min and load of 0 Horse Power (HP) are selected. These data include four types of bearing vibration data: normal bearing, bearing outer ring fault, bearing inner ring fault and rolling element deletion. This data set is used in the algorithm generalization verification experiment.

5.1. Data denoising test

First, CEEMDAN signal decomposition is performed on four types of bearing vibration signals respectively to obtain IMFs, and the original one-dimensional vibration signals are converted into multi-dimensional vibration signals for subsequent processing. The decomposed results are shown in FIG. 16A, FIG. 16B, FIG. 16C and FIG. 16D.

The IMFs after signal decomposition are arranged in sequence from high frequency to low frequency. By calculating the PE value of each IMF, the proportion of noise in the components is determined, and the components with PE value greater than 0.5 are regarded as noisy components, and the noisy components are denoised by wavelet threshold decomposition, so as to extract the original signal information. The calculation results of PE values corresponding to IMFs with different bearing vibration signal decomposition are Table 1

TABLE 1

|  | Normal state | Inner ring fault | Outer ring fault | Rolling element fault |
| --- | --- | --- | --- | --- |
| PE (IMF1) | 0.7461 | 0.7536 | 0.7570 | 0.7569 |
| PE (IMF2) | 0.0207 | 0.0141 | 0.0212 | 0.0151 |
| PE (IMF3) | 0.5583 | 0.5225 | 0.5461 | 0.5274 |
| PE (IMF4) | 0.4184 | 0.4214 | 0.4127 | 0.4320 |
| PE (IMF5) | 0.3550 | 0.3709 | 0.3563 | 0.3688 |
| PE (IMF6) | 0.3118 | 0.3376 | 0.3274 | 0.3323 |
| PE (IMF7) | 0.3022 | 0.3075 | 0.2847 | 0.3099 |

The noisy IMFs are extracted and further decomposed and quantized by wavelet threshold denoising. The wavelet threshold parameter is set to sym4 as the wavelet base, Sqtwolog threshold, hard threshold function, with a decomposition level of 3. Noise with variance of 0.01 is added to the original signal to obtain the noisy signal y, a new IMFs component is obtained through denoising, and then the IMFs component is reconstructed to obtain a denoised signal. As shown in Table 2, the signal-to-noise ratio (SNR) and mean square error (MSE) of reconstructed signal are calculated to fully reflect the bearing signal difference before and after denoising, which proves the effectiveness of this method.

The signal mean square error formula is defined as the square difference between the non-denoised signal xi and the denoised signal x'$_i$, and the formula is as follows:

$$MSE = \frac{1}{N}\sum_{i=1}^{N}(x_i - x'_i)^2 (i = 1, 2, \ldots, n). \quad (31)$$

The signal-to-noise ratio formula is defined as follows:

$$SNR = 10\log_{10}\left[\frac{\sum_{i=1}^{N} x_i^2}{\sum_{i=1}^{N}(x_i - x'_i)^2}\right]. \quad (32)$$

In order to show the superiority of CEEMDAN-PE-WTD, the traditional wavelet threshold denoising is compared with CEEMDAN-PE-WTD, where the traditional wavelet threshold denoising selects the same parameter settings as CEEMDAN-PE-WTD. The denoising effects of two denoising methods on four types of bearing vibration signals are shown in Table 2.

TABLE 2

| Indexes | Signal | Normal state | Inner ring fault | Outer ring fault | Rolling element fault |
|---|---|---|---|---|---|
| SNR | y | 5.20 | 4.81 | 5.28 | 4.72 |
| | WTD (y) | 13.73 | 12.94 | 12.70 | 12.36 |
| | CEEMDAN-PE-WTD (y) | 14.65 | 13.76 | 13.82 | 14.27 |
| MSE | WTD (y) | 0.0094 | 0.0090 | 0.0091 | 0.0090 |
| | CEEMDAN-PE-WTD (y) | 0.0093 | 0.0092 | 0.0093 | 0.0095 |

The MSE of the reconstructed signal by CEEMDAN-PE-WTD method is almost the same as MSE of the reconstructed signal by traditional wavelet threshold denoising. It may be seen from the SNR index that both methods have good denoising effects on the original signal. However, CEEMDAN-PE-WTD method has a better denoising effect. The SNRs of the four types of bearing vibration signals through the CEEMDAN-PE-WTD method for denoising the reconstructed signal are improved by an average of 1.19 compared with the SNR through the traditional wavelet threshold denoising for the reconstructed signal.

5.2. Data coding experiment

The original one-dimensional bearing vibration signals are encoded in a way of smooth overlapping sampling with a window length of 2048 and a step size of 1024, and the four types of fault type data are encoded by GASF, GADF, Markov Transition Field (MTF) and FFT-x coding respectively. Each coding method converts image data with resolution of 32×32, 64×64, 128×128, 256×256 and 512×512 respectively, and the image bit depth is 32, so as to verify the influence of image resolution on diagnosis results. When the original data are coded in four coding methods, and each coding method is processed into five resolutions, 20 image data sets are constructed, and there are 4,000 images in each data set with four fault types. According to the ratio of 7:2:1, the data are split to generate training sets, verification sets and test sets, and these sets are sent to a convolutional neural network model for training and classification. The neural network model uses MobileNetV1[28], the parameter setting optimizer is Adam, the learning rate is 0.001, the Batchsize is 16, and the training is 150 rounds. The evaluation indexes are the accuracy of test set, the training time and diagnosis time of each Batchsize data. A comparison of the diagnostic results of four types of coded data sets with different pixel sizes is shown in Table 3.

As may be seen from Table 3, when the coding resolution is 32×32, all three coding methods, GASF, GADF and MTF, show loss of signal features, resulting in low model diagnosis accuracy. In contrast, FFT-x coding method has higher diagnostic accuracy while maintaining the fast diagnostic speed, and a faster diagnostic speed under the same diagnostic accuracy. The accuracy of FFT-x coded data sets is 98.25% when the diagnosis time is 6 millisecond (ms), which is 4.75%, 8.5% and 3.75% higher than GADF, GASF and MTF respectively.

TABLE 3

| Coding method | Image size | Accuracy (%) | Training delay (ms) | Diagnostic delay (ms) |
|---|---|---|---|---|
| GASF | 32 × 32 | 46.75 | 10 | 3 |
| | 64 × 64 | 93.50 | 10 | 6 |
| | 128 × 128 | 96.50 | 23 | 7 |
| | 256 × 256 | 99.25 | 87 | 16 |
| | 512 × 512 | 98.75 | 309 | 50 |
| GADF | 32 × 32 | 38.50 | 9 | 3 |
| | 64 × 64 | 89.75 | 10 | 6 |
| | 128 × 128 | 97.50 | 25 | 8 |
| | 256 × 256 | 97.75 | 81 | 15 |
| | 512 × 512 | 97.75 | 311 | 51 |
| MTF | 32 × 32 | 49.75 | 9 | 3 |
| | 64 × 64 | 94.50 | 10 | 6 |
| | 128 × 128 | 97.25 | 23 | 7 |
| | 256 × 256 | 98.75 | 83 | 14 |
| | 512 × 512 | 98.50 | 309 | 53 |
| FFT-x* | 32 × 32 | 97.25 | 10 | 3 |
| | 64 × 64 | 98.25 | 11 | 6 |
| | 128 × 128 | 98.50 | 24 | 7 |
| | 256 × 256 | 97.75 | 82 | 15 |
| | 512 × 512 | 98.75 | 315 | 50 |

5.3. Model comparison experiment

In order to avoid the impact of too much loss of bearing vibration signal features due to too small image resolution, the FFT-x coded data set with a resolution size of 64×64 is selected. The constructed L-CNN model is compared with representative lightweight neural network models of Xceptption, EfficinetNetB$_0$ to EfficinetNetB$_7$, MobileNetV1, MobileNetV2 and MobileNetV3. The evaluation indexes are the diagnostic accuracy, loss value, training parameters, forward propagation operation times and model size of the models. The diagnosis comparison of different lightweight convolutional neural network models is shown in Table 4.

TABLE 4

| Models | Accuracy (%) | Loss value | Training parameter quantity (M) | Number of operations (M) | Model size (MB) |
|---|---|---|---|---|---|
| Xceptption | 97.75 | 0.1863 | 20328 | 8 | 224 |
| EfficinetNetB$_0$ | 98.00 | 0.1349 | 3919 | 622 | 48 |
| EfficinetNetB$_1$ | 95.00 | 0.2824 | 6366 | 1095 | 78 |
| EfficinetNetB$_2$ | 97.50 | 0.2390 | 7526 | 1296 | 92 |
| EfficinetNetB$_3$ | 76.74 | 0.5708 | 10452 | 1832 | 127 |
| EfficinetNetB$_4$ | 98.25 | 0.1259 | 17144 | 3066 | 207 |
| EfficinetNetB$_5$ | 98.00 | 0.1806 | 27685 | 5059 | 335 |

TABLE 4-continued

| Models | Accuracy (%) | Loss value | Training parameter quantity (M) | Number of operations (M) | Model size (MB) |
|---|---|---|---|---|---|
| EfficinetNet$B_6$ | 97.50 | 0.2175 | 39790 | 7342 | 481 |
| EfficinetNet$B_7$ | 98.00 | 0.1932 | 62302 | 11668 | 752 |
| MobileNetV1 | 98.25 | 0.2087 | 3145 | 45264 | 38 |
| MobileNetV2 | 95.50 | 0.7122 | 2177 | 23883 | 26 |
| MobileNetV3 | 92.25 | 1.1015 | 1486 | 1033 | 18 |
| L-CNN* | 98.25 | 0.1162 | 431 | 7906 | 5 |

As may be seen from Table 4, compared with other lightweight convolutional neural network models, the memory occupied by L-CNN model is 5 megabyte (MB), which is 33 MB less than that of MobileV1, the training parameters are 2714 Mbps (M) less than that of MobileV1, and the cross entropy loss value is 0.0925 less. In order to further verify the generalization ability of L-CNN model diagnosis, the L-CNN model is used to compare the data sets with the resolution of 64×64 under the four coding methods of GADF, GASF, MTF and FFT-x. The diagnostic confusion matrix of four coded data sets is shown in FIG. 17A, FIG. 17B, FIG. 17C and FIG. 17D.

The diagnostic accuracy of L-CNN model for GADF coded data set is 94.25%, which is 0.75% higher than that of MobileNetV1. The diagnostic accuracy of GASF coded data set is 92.75%, which is 3% higher than that of MobileNetV1. The diagnostic accuracy of MTF coded data set is 95.00%, which is 0.5% higher than that of MobileNetV1, and the diagnostic accuracy of FFT-x coded data set is 98.25%. Compared with MobileNetV1 model, the training parameters of L-CNN model are reduced by 84% and the training speed is increased by 20%, which further verifies the superiority of L-CNN model diagnosis.

5.4. Ablation test

In order to further verify the effectiveness of denoising and coding, the effects of combining phase angle features, CEEMDAN-PE-WTD denoising method, overlapping sampling and other steps in FFT-based coding on diagnosis accuracy are tested respectively. The ablation experiment is based on the L-CNN model, and the comparison results of the classification accuracy of the model test set are shown in Table 5.

TABLE 5

| Fast Fourier transform | Phase angle | Overlapping Sampling | CEEMDAN-PE-WTD denoising | Accuracy (%) |
|---|---|---|---|---|
| √ | | | | 97.50 |
| √ | √ | | | 98.00 |
| √ | √ | √ | | 98.25 |
| √ | √ | √ | √ | 98.75 |

As may be seen from Table 5, the diagnostic accuracy of bearing one-dimensional vibration data after FFT coding is 97.50%. After combining the phase angle features, the diversity of data features is enhanced, and the diagnostic accuracy is improved by 0.5%. Overlapping sampling of the data makes the sampled data more abundant, and the diagnostic accuracy is improved by 0.25%. After denoising the bearing one-dimensional vibration data by CEEMDAN-PE-WTD method, the interference of noise on the original signal is reduced, and the diagnostic accuracy is improved by 0.5%. Finally, the data set generated by FFT-x coding may improve the fault diagnostic accuracy to 98.75% on the L-CNN model. The superiority of the rolling bearing fault diagnosis method based on FFT coding and L-CNN is verified.

5.5 Diagnosis method comparison experiment

In order to further verify the superiority of the algorithm proposed by the disclosure, the diagnosis results of three models, namely, extreme learning machine (ELM), two-dimensional convolutional neural network (2DCNN) and one-dimensional convolutional neural network (1DCNN), on the one-dimensional time vibration signal of the original bearing are compared, and the diagnosis results of the L-CNN model on the coded data sets of FFT-x, GADF, GASF and MTF are compared. The experimental results are shown in Table 6.

TABLE 6

| Dimension | Data format | Models | Accuracy (%) |
|---|---|---|---|
| One-dimensional | Bearing vibration signal | ELM | 79.17 |
| | | 2DCNN | 88.00 |
| | | 1DCNN | 92.50 |
| Two-dimensional | GASF | L-CNN | 92.75 |
| | GADF | L-CNN | 94.25 |
| | MTF | L-CNN | 95.00 |
| | FFT-x* | L-CNN | 98.25 |
| | CEEMDAN-PE-WTD-FFT-x* | L-CNN | 98.75 |

The denoised FFT-x coding method has the highest fault classification accuracy, and the diagnostic accuracy is 98.75%, thus proving that the CEEMDAN-PE-WTD denoising method and FFT-x coding are effective in rolling bearing fault classification.

5.6. Algorithm Generalization Verification Test

Figure 18:
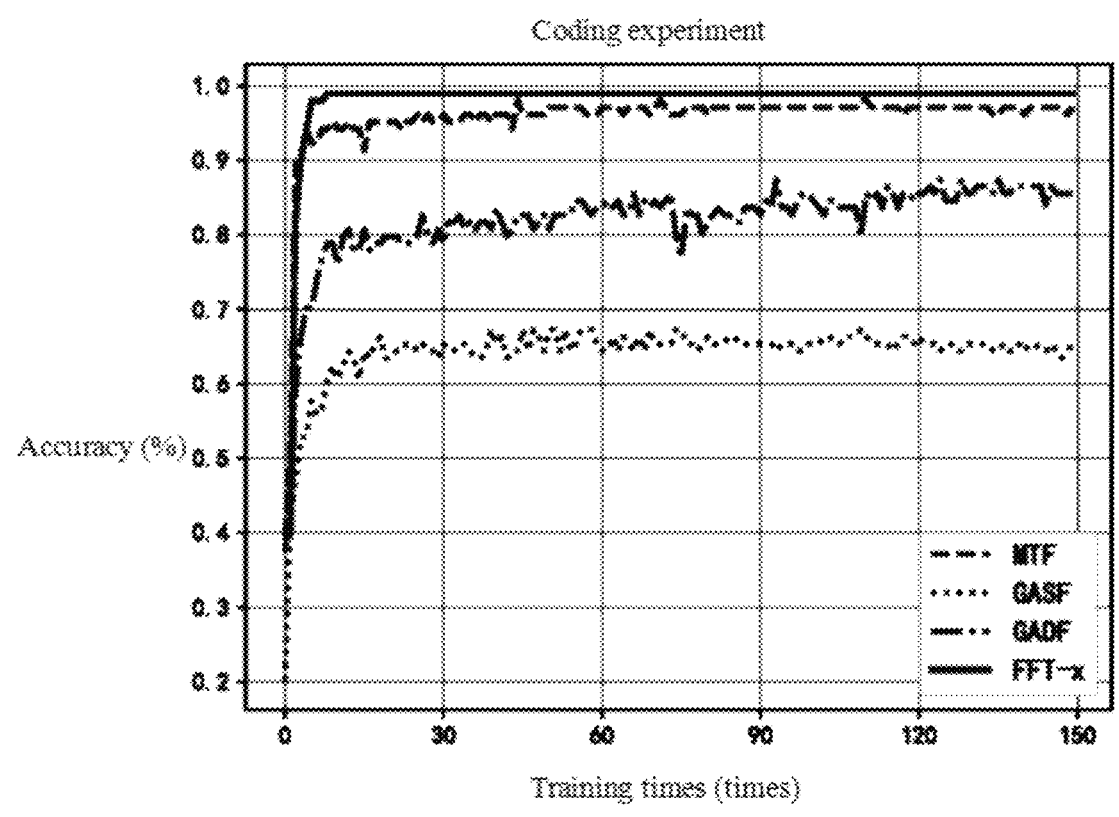
FIG. 18 is a comparative schematic diagram of a coding experiment according to an embodiment of the disclosure.

The one-dimensional bearing vibration data from Western Reserve University are sampled according to a window length of 2048 and a step size of 1024 with smooth overlapping, and then the bearing vibration data of the four fault types are coded with GASF coding, GADF coding, MTF coding, and FFT-x coding, respectively. The resolution of the coded images is 64×64 and the bit depth is 32. Each kind of coded data set contains 200 pictures of normal bearing, 100 pictures of outer ring wear, 100 pictures of inner ring wear and 100 pictures of rolling element deletion. The training sets, test sets and verification sets are divided according to 7:2:1, and the diagnosis experiments are classified based on L-CNN model. The experimental results are shown in FIG. 18.

The diagnostic accuracy of L-CNN model for GADF coded data set with the same image resolution of 64×64 is 85.58%, the diagnostic accuracy of GASF coded data set is 65.38%, the diagnostic accuracy of MTF coded data set is 97.12%, and the diagnostic accuracy of FFT-x coded data set is 99.00%, respectively. Compared with GADF, GASF and MTF, the diagnostic accuracy of FFT-x coded data set is improved by 13.42%, 33.62% and 1.88% respectively. Therefore, it is concluded that the FFT-x coding method has the highest diagnostic accuracy under the same diagnostic speed.

The disclosure provides a rolling bearing fault diagnosis method based on FFT coding and L-CNN. The differences of frequency domain data features of different bearing fault types are expressed by FFT-x coding, and image features are independently learned and diagnosed by the improved lightweight convolutional neural network, so that the tedious signal processing work required for extracting fault feature information from the original data is omitted, the labor cost is reduced, and the diagnosis accuracy is improved. In addition, compared with other popular convolutional neural network diagnosis methods, the proposed method may achieve higher diagnostic accuracy. On the laboratory data set, the fault diagnostic accuracy of this method is 98.75%, which is 10.75% higher than that of the two-dimensional convolutional neural network diagnosis method. Compared with the one-dimensional convolutional neural network diagnosis method, the accuracy is improved by 6.25%. In the bearing data set of Western Reserve University, when the image coding resolution is 64×64, the diagnostic accuracy of FFT-x coding is 99.00%, which is 33.62% higher than that of GASF coding.

The above are only the preferred embodiments of this disclosure, but the protection scope of this disclosure is not limited to this. Any change or replacement that may be easily thought of by a person familiar with this technical field within the technical scope disclosed in this disclosure should be covered by this disclosure. Therefore, the protection scope of this disclosure should be based on the protection scope of the claims.

The invention claimed is:

1. A rolling bearing fault diagnosis method based on FFT coding and L-CNN, comprising:

obtaining original bearing fault vibration data, extracting intrinsic mode components of different frequency bands in the original bearing fault vibration data, calculating a permutation entropy value corresponding to each of the intrinsic mode components, and performing wavelet threshold denoising according to the permutation entropy value to obtain a denoised reconstructed time domain signal;

performing fast Fourier transform to the denoised reconstructed time domain signal to obtain a frequency domain signal and a phase angle corresponding to the time domain signal, reconstructing the frequency domain signal according to a preset rule, retaining frequency domain data of features of the phase angle, and drawing FFT-x heat maps of different fault type data according to an amplitude range; wherein the drawing FFT-x heat maps of different fault type data comprises:

decomposing the denoised reconstructed time domain signal into several single harmonic components by fast Fourier transform, and obtaining a relationship between amplitude, phase, power and frequency domain of each harmonic of the signal; and when the phase angle is in a first quadrant and a second quadrant, a frequency domain value is positive, and when the phase angle is in a third quadrant and a fourth quadrant, a frequency domain value is negative; and according to this characteristic, reconstructing the frequency domain signal, and according to an amplitude characteristic of a reconstructed frequency domain signal, setting a boundary to (−150, 150) for heat map coding; and constructing an improved lightweight convolutional neural network model L-CNN, and inputting coded data in the FFT-x heat maps into the L-CNN model for processing and diagnosis, and obtaining fault diagnosis results;

the inputting coded data in the FFT-x heat maps into the L-CNN model for processing and diagnosis, comprising:

capturing different levels of features of the coded data in the FFT-x from different scales by using convolution kernels with different sizes, and weighting captured features for importance of each channel by structures of global average pooling, one-dimensional convolution, channel multiplication and spatial replication through an ECA attention mechanism; and processing a channel dimension and a spatial dimension of a color feature of an input FFT-x coded map by depth separable convolution to obtain a feature map; exchanging a channel sequence of the feature map between different depths and different groups by using a ChannelSplit module and a Channelshuffle module, and changing a channel arrangement mode; further extracting data features based on the residual and depth separable convolution; and finally, outputting the fault diagnosis results through average pooling and two fully connected layers.

2. The rolling bearing fault diagnosis method based on FFT coding and L-CNN according to claim 1, wherein the extracting intrinsic mode components of different frequency bands in the original bearing fault vibration data comprises:

S1.1, adding Gaussian white noises with normal distribution to the original bearing fault vibration data to obtain an i-th signal $y_i(t)$, and decomposing the i-th signal $y_i(t)$ by EMD to obtain a first intrinsic mode function $IMF_1(t)$ and a residual component $r_1(t)$ of $y_i(t)$;

S1.2, using the residual component $r_1(t)$ as original data to decompose reconstructed $r_1(t)+\beta_1 E_1(\omega_i(t))$ to obtain an intrinsic mode function $IMF_2(t)$ and a residual component $r_2(t)$, wherein $E_1$ is EMD decomposition, $\beta_1$ is a standard deviation of the Gaussian white noises, and $\omega_i(t)$ is a Gaussian white noise; and S1.3, repeating the S1.2 to obtain a (k+1)-th intrinsic mode function $IMF_{k+1}(t)$ and a k-th residual component $r_k(t)$.

3. The rolling bearing fault diagnosis method based on FFT coding and L-CNN according to claim 2, wherein performing wavelet threshold denoising according to the permutation entropy value comprises:

judging a noisy level of the each of the intrinsic mode components according to the permutation entropy value, and dividing the each of the intrinsic mode components into an effective IMF and a noisy IMF according to the noisy level;

based on data features of the noisy IMF, selecting wavelet bases and decomposition layers to decompose noisy bearing fault vibration data, and calculating wavelet coefficients and selecting a Sqtwolog threshold to calculate a threshold corresponding to each of the wavelet coefficients, and quantizing the wavelet coefficients; and performing inverse wavelet transform to quantized wavelet coefficients to obtain a denoised IMF, and then reconstructing a bearing vibration signal from the effective IMF and the denoised IMF to obtain the denoised reconstructed signal.

4. The rolling bearing fault diagnosis method based on FFT coding and L-CNN according to claim 3, wherein a method for calculating the wavelet coefficients is:

$$I_{CWT}(a, b) = \frac{1}{\sqrt{a}} \int x(t)\phi\left(\frac{t-b}{a}\right)dt$$

wherein $I_{CWT}$ is a wavelet coefficient, a is a scale function, b is a position function, and t is a delay time;

a method for calculating a threshold corresponding to each of the wavelet coefficients is:

$$th = \frac{mid}{0.6745}\sqrt{2\ln N}$$

wherein th is the threshold corresponding to the each of the wavelet coefficients, mid is a middle value of each decomposed band coefficient, and N is a length of the wavelet coefficient.

5. The rolling bearing fault diagnosis method based on FFT coding and L-CNN according to claim 1, wherein an expression of the reconstructed frequency domain signal is:

$$F(x) = \begin{cases} f(x) & \theta > 0 \\ -f(x) & \theta < 0 \end{cases}$$

wherein F(x) is the reconstructed frequency domain signal, f(x) is an original bearing frequency domain signal, and θ is the phase angle.

6. The rolling bearing fault diagnosis method based on FFT coding and L-CNN according to claim 1, wherein an objective function of the improved lightweight convolutional neural network model is evaluated as a cross entropy loss function:

$$\text{Loss} = -\sum_{i=1}^{\substack{output \\ size}} y_i \cdot \log \hat{y}_i$$

wherein Loss is a model loss value, $y_i$ is a model fault classification prediction value, and $\hat{y}_i$ is a model classification true value.

* * * * *